United States Patent
Chopra et al.

(10) Patent No.: US 11,734,337 B2
(45) Date of Patent: *Aug. 22, 2023

(54) IDENTIFYING DIGITAL ATTRIBUTES FROM MULTIPLE ATTRIBUTE GROUPS UTILIZING A DEEP COGNITIVE ATTRIBUTION NEURAL NETWORK

(71) Applicant: Adobe Inc., San Jose, CA (US)

(72) Inventors: Ayush Chopra, Delhi (IN); Mausoom Sarkar, New Delhi (IN); Jonas Dahl, Basel (CH); Hiresh Gupta, Shimla (IN); Balaji Krishnamurthy, Noida (IN); Abhishek Sinha, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,922

(22) Filed: Jun. 14, 2022

(65) Prior Publication Data
US 2022/0309093 A1     Sep. 29, 2022

Related U.S. Application Data

(63) Continuation of application No. 16/564,831, filed on Sep. 9, 2019, now Pat. No. 11,386,144.

(51) Int. Cl.
*G06F 16/532*     (2019.01)
*G06F 16/535*     (2019.01)
(Continued)

(52) U.S. Cl.
CPC .......... *G06F 16/532* (2019.01); *G06F 16/535* (2019.01); *G06F 16/55* (2019.01);
(Continued)

(58) Field of Classification Search
CPC ...... G06F 16/532; G06F 16/535; G06F 16/55; G06F 17/15; G06F 18/22; G06F 18/24;
(Continued)

(56) References Cited

U.S. PATENT DOCUMENTS

| | | | |
|---|---|---|---|
| 6,574,378 B1 * | 6/2003 | Lim | G06F 16/5854 |
| | | | 707/E17.024 |
| 9,158,970 B2 | 10/2015 | Zhang et al. | |

(Continued)

FOREIGN PATENT DOCUMENTS

| | | | | |
|---|---|---|---|---|
| CA | 3108525 A1 * | 2/2020 | | G06F 17/18 |
| CN | 108604315 A * | 9/2018 | | G06N 3/0454 |

(Continued)

OTHER PUBLICATIONS

Christian Szegedy et al. "Going Deeper with Convolutions," Sep. 17, 2014, https://arxiv.org/abs/1409.4842, p. 1-12.
(Continued)

*Primary Examiner* — Mahendra R Patel
(74) *Attorney, Agent, or Firm* — Keller Preece PLLC

(57) ABSTRACT

The present disclosure relates to systems, methods, and non-transitory computer-readable media for generating tags for an object portrayed in a digital image based on predicted attributes of the object. For example, the disclosed systems can utilize interleaved neural network layers of alternating inception layers and dilated convolution layers to generate a localization feature vector. Based on the localization feature vector, the disclosed systems can generate attribute localization feature embeddings, for example, using some pooling layer such as a global average pooling layer. The disclosed systems can then apply the attribute localization feature embeddings to corresponding attribute group classifiers to generate tags based on predicted attributes. In particular, attribute group classifiers can predict attributes as associated with a query image (e.g., based on a scoring comparison with other potential attributes of an attribute group). Based on the generated tags, the disclosed systems can respond to tag queries and search queries.

20 Claims, 16 Drawing Sheets

(51) Int. Cl.
  *G06F 17/15* (2006.01)
  *G06N 3/04* (2023.01)
  *G06F 16/55* (2019.01)
  *G06F 18/22* (2023.01)
  *G06F 18/24* (2023.01)
  *G06V 10/764* (2022.01)
  *G06V 10/82* (2022.01)
  *G06V 10/44* (2022.01)

(52) U.S. Cl.
  CPC .............. *G06F 17/15* (2013.01); *G06F 18/22* (2023.01); *G06F 18/24* (2023.01); *G06N 3/04* (2013.01); *G06V 10/454* (2022.01); *G06V 10/764* (2022.01); *G06V 10/82* (2022.01)

(58) Field of Classification Search
  CPC ............ G06N 3/04; G06N 3/045; G06N 3/08; G06V 10/454; G06V 10/764; G06V 10/82
  USPC ........................................................ 382/190
  See application file for complete search history.

(56) References Cited

U.S. PATENT DOCUMENTS

| | | | |
|---|---|---|---|
| 9,595,004 B2* | 3/2017 | Sweeney | G06N 5/022 |
| 10,043,109 B1 | 8/2018 | Du et al. | |
| 10,318,503 B1 | 6/2019 | Swamy | |
| 10,678,846 B2 | 6/2020 | Gordo et al. | |
| 10,776,626 B1 | 9/2020 | Lin et al. | |
| 10,846,327 B2 | 11/2020 | Salokhe et al. | |
| 10,860,642 B2 | 12/2020 | Rose et al. | |
| 10,866,976 B1* | 12/2020 | Yoon | G06F 16/3334 |
| 10,866,985 B2* | 12/2020 | Chandra Sekar Rao | G06N 3/08 |
| 10,867,180 B2* | 12/2020 | Badr | G06F 16/90332 |
| 10,885,385 B2* | 1/2021 | Kim | G06V 10/761 |
| 10,942,966 B2 | 3/2021 | Kislyuk et al. | |
| 11,055,343 B2 | 7/2021 | Xu et al. | |
| 11,100,179 B1* | 8/2021 | Zhou | G06F 16/532 |
| 11,341,186 B2* | 5/2022 | Bender | G06F 16/532 |
| 11,657,094 B2* | 5/2023 | Moon | G06N 3/049 706/15 |
| 2006/0251338 A1* | 11/2006 | Gokturk | G06F 18/22 707/E17.022 |
| 2007/0288453 A1* | 12/2007 | Podilchuk | G06F 16/5854 707/999.005 |
| 2011/0025694 A1* | 2/2011 | Ptucha | G06T 11/60 345/467 |
| 2016/0092959 A1* | 3/2016 | Gross | G06Q 30/0625 705/26.62 |
| 2016/0259994 A1 | 9/2016 | Ravindran et al. | |
| 2017/0097948 A1* | 4/2017 | Kerr | G06F 16/532 |
| 2018/0012110 A1 | 1/2018 | Souche et al. | |
| 2018/0204111 A1* | 7/2018 | Zadeh | G06V 10/764 |
| 2019/0220694 A1* | 7/2019 | Biswas | G06N 3/08 |
| 2019/0258895 A1* | 8/2019 | Sacheti | G06V 40/10 |
| 2019/0354609 A1* | 11/2019 | Huang | G06F 16/532 |
| 2019/0361896 A1* | 11/2019 | Brunets | G06Q 10/04 |
| 2019/0362154 A1* | 11/2019 | Moore | G06Q 30/0277 |
| 2020/0174630 A1* | 6/2020 | Rosenberg | G06F 3/013 |
| 2020/0336802 A1* | 10/2020 | Russell | G06V 20/46 |
| 2020/0405148 A1 | 12/2020 | Tran | |
| 2021/0081698 A1* | 3/2021 | Lindeman | G06N 3/049 706/15 |

FOREIGN PATENT DOCUMENTS

| | | | | |
|---|---|---|---|---|
| CN | 110019917 A | | 7/2019 | |
| CN | 111602152 A | * | 8/2020 | ....... G06F 16/24575 |
| WO | WO-2018048355 A1 | * | 3/2018 | ........... G06F 16/783 |

OTHER PUBLICATIONS

Faraz Saeedan et al. "Detail-Preserving Pooling in Deep Networks," https://arxiv.org/pdf/1804.04076.pdf, Apr. 11, 2018, p. 1-10.
Fisher Yu et al., "Multi-Scale Context Aggregation by Dilated Convolutions," https://arxiv.org/abs/1511.07122, Apr. 30, 2016, p. 1-13.
U.S. Appl. No. 16/564,831, Sep. 2, 2021, Preinterview 1st Office Action.
U.S. Appl. No. 16/564,831, Oct. 20, 2021, Office Action.
U.S. Appl. No. 16/564,831, Dec. 24, 2021, Office Action.
U.S. Appl. No. 16/564,831, Mar. 16, 2022, Notice of Allowance.

* cited by examiner

| Attribute Groups 702 | Cognitive Attribute Classification System 106 | Batch-Norm Inception-V1 |
|---|---|---|
| Sleeve | 0.890070923949089 | 0.748620959883886 |
| Neckline | 0.849290780705481 | 0.693459416887157 |
| Pocket | 0.914795115484413 | 0.864213948272362 |
| Collar | 0.921542551641486 | 0.801960205214525 |
| Gender | 0.971452345211374 | 0.921652345489320 |

IDENTIFYING DIGITAL ATTRIBUTES FROM MULTIPLE ATTRIBUTE GROUPS UTILIZING A DEEP COGNITIVE ATTRIBUTION NEURAL NETWORK

CROSS-REFERENCE TO RELATED APPLICATIONS

This application is a continuation of U.S. patent application Ser. No. 16/564,831, filed on Sep. 9, 2019. The aforementioned application is hereby incorporated by reference in its entirety.

BACKGROUND

Recent years have seen significant improvements in computer systems that provide digital content to client devices across computer networks. For example, conventional systems are now able to generate digital recommendations or query responses through recommendation models that focus on modeling global co-occurrence counts. To illustrate, conventional systems can apply collaborative filtering to generate and provide digital recommendations to client devices based on identified digital features of the client devices.

In addition to such recommendations models, some conventional systems model dynamic content of instantaneous query images to improve recommendations or search results. For example, some conventional systems utilize similarity frameworks that compare multiple digital images and provide digital search results based on determined similarity metrics between the digital images. Thus, conventional systems can receive a query based on a digital image and identify digital search results based on similarity metrics corresponding to the digital image query.

Although conventional systems can generate and provide digital recommendations and/or digital search results to client devices, these conventional systems suffer from a number of technical deficiencies, particularly in relation to flexibility, efficiency, and accuracy of operation. As one example, conventional attribute classification systems are inflexible in relation to analyzing and identifying attributes of a digital image. For example, conventional systems that utilize collaborative filtering or digital image similarity measures rigidly produce similar digital images, but cannot target or compare particular identified attributes within digital images. Although some existing classification models exist, these systems are also rigid, in that they cannot easily scale or evolve to include different attributes. To the contrary, classification models typically require individual training of individual classifiers to generate additional classification predictions.

In addition, conventional systems are often inefficient. In particular, conventional systems or models often include a large number of parameters that require significant computation expense to train and utilize. For example, conventional classification models typically require a large number of parameters for individual classifier networks. These large number of parameters can lead to excessive time and use of processing resources in training or application.

In addition, conventional systems are often inaccurate. For instance, although conventional systems can identify similar digital images (or predict digital images that may be of interest based on collaborate filtering), they often fail to accurately generate tags or digital search responses that reflect desired features or attributes portrayed in a digital image. For example, in searching for an object with a particular attribute or visual feature, conventional systems will often provide suggested responses that fail to include this desired attribute. Accordingly, conventional systems often generate unhelpful search results or dissimilar recommendations in response to search queries. This often leads to additional inefficiencies in time, resources, user interfaces, and user interactions in scrolling through search results to identify pertinent digital content.

BRIEF SUMMARY

Aspects of the present disclosure can include methods, computer-readable media, and systems that identify digital attributes from multiple attribute groups within target digital images utilizing a deep cognitive attribution neural network. For example, in some embodiments, the disclosed systems utilize a deep neural network to efficiently localize and predict higher-order attributes or facets for query images. Specifically, the disclosed systems can utilize a cognitive attribution neural network that includes a base neural network (for attribute localization) trained in concert with a series of classifiers (that identify attributes within particular attribute groups). For instance, in one or more embodiments, the disclosed systems utilize a base neural network that includes interleaved dilated convolution blocks and inception modules to generate localization feature embeddings. Based on the localization feature embeddings, the disclosed systems can utilize trained classifiers to predict attributes for different attribute groups. Based on these attributes, the disclosed systems can generate recommendations and/or respond to digital queries from various computer devices. Indeed, the disclosed systems can efficiently and flexibly support a variety of systems for providing digital content, such as generating accurate tags to allow for powerful exploration of a repository of digital images (e.g., a digital image catalogue) or accurately refining digital image searches from client devices.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
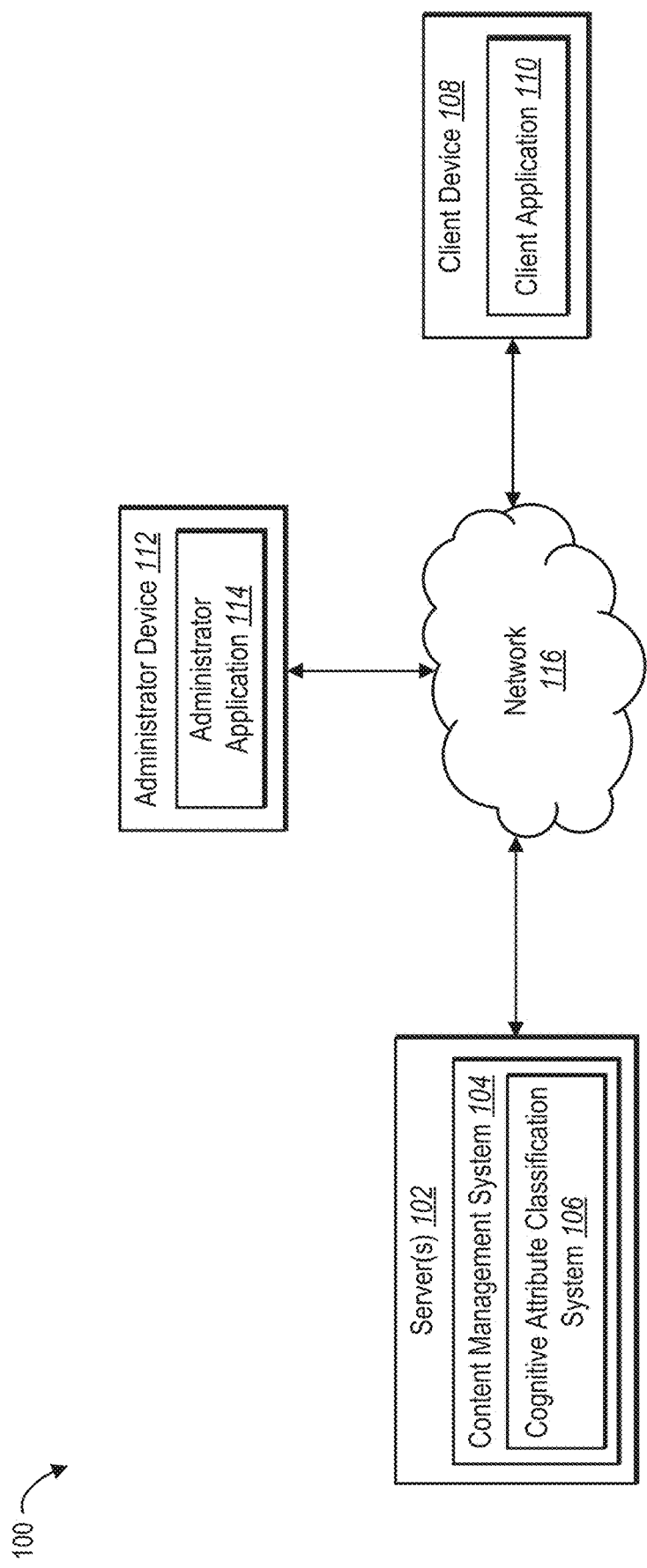
FIG. 1 illustrates a diagram of an environment in which a cognitive attribute classification system can operate in accordance with one or more embodiments.

This disclosure describes one or more embodiments of a cognitive attribute classification system that intelligently trains and applies a cognitive attribution neural network to identify digital attributes from multiple attribute groups within target digital images. In particular, the cognitive attribute classification system can utilize a cognitive attribution neural network that includes a base neural network and one or more attribute group classifiers to determine tags for objects portrayed in query images. For instance, the cognitive attribute classification system can use a base neural network that includes an architecture of interleaved layers to efficiently localize attributes of a query image. The cognitive attribute classification system can also utilize attribute group classifiers to identify multiple attributes of the query image within a single network. The cognitive attribute classification system can then utilize these attributes to generate tags and/or generate digital responses to image-based queries.

As mentioned above, the cognitive attribute classification system can utilize a base neural network with interleaved layers to localize attributes. To illustrate, the cognitive attribute classification system can apply alternating dilated convolution layers and inception layers of the base neural network to a query image to generate a localization feature vector. By using the alternating dilated convolution layers and inception layers, the cognitive attribute classification system can increase a purview of intermediate receptive fields for more accurately representing, in the localization feature vector, features/properties of attributes that are distributed over multiple connected portions of an object in the query image.

Based on the localization feature vector, the cognitive attribute classification system can, in turn, generate a plurality of attribute localization feature embeddings (e.g., using some pooling layer such as a global average pooling layer). By generating the plurality of attribute localization feature embeddings, the cognitive attribute classification system can better disentangle different attributes of a query image (e.g., create more attribute-specific embeddings). For example, the cognitive attribute classification system can analyze the plurality of attribute localization feature embeddings utilizing a set of corresponding attribute group classifiers to generate predicted attributes. In particular, each attribute group classifier can predict a respective attribute associated with a query image (e.g., based on a scoring comparison with other potential attributes of an attribute group). Then, based on the predicted attributes, the cognitive attribute classification system can generate corresponding tags in association with the query image.

In addition to utilizing a cognitive attribute neural network that includes a base neural network and one or more attribute group classifiers, the cognitive attribute classification system can also train the base neural network and attribute group classifiers of the cognitive attribute neural network. For example, given a training query image, the cognitive attribute classification system can utilize the base neural network and the attribute group classifiers to generate one or more predicted attributes. The cognitive attribute classification system can compare these predicted attributes to ground truth attributes to determine classification losses (e.g., classification losses specific to a particular attribute). Then, based on the classification losses for respective attributes, the cognitive attribute classification system can modify parameters in the base neural network and corresponding attribute group classifiers.

As mentioned above, the cognitive attribute classification system can receive query images (e.g., a batch of query images from a catalog in a retailer-onboarding process) and generate query responses. For example, in some embodiments, the cognitive attribute classification system receives a tag query for a catalog of images and, in response, generates a database of tags for the catalog of images. The cognitive attribute classification system can also receive an image query and generate a digital response identifying similar digital images based on determined attributes. For example, in some embodiments, the cognitive attribute classification system can perform a fine-grained visual similarity search and return recommendations or search results based on the generated tags for the query image and tags of candidate matches.

The cognitive attribute classification system of the present disclosure provides many advantages and benefits over these conventional systems and methods. For example, by utilizing a cognitive attribution neural network comprising a base localization neural network and attribute group classifiers, the cognitive attribute classification system can improve flexibility relative to conventional systems. For example, the cognitive attribute classification system can identify various attributes within digital images and generate tags and/or generate digital responses to queries based on these attributes. Thus, the cognitive attribute classification system can compare digital images and objects portrayed in digital images based on a wide variety of explicit attributes from multiple attribute groups (e.g., shirts with "v-neck" or shirts with a rounded neck). Moreover, by applying a base localization neural network, the cognitive attribute classification system can flexibly localize multiple attributes and more flexibly add or modify attributes utilized by the cognitive attribute classification system. For example, upon training the base localization neural network of the cognitive attribute classification system to localize a set of attributes of a query image, the cognitive attribution classification system can adaptively add additional attribute groups/attributes without training new/separate networks from scratch.

In addition to improving flexibility, the cognitive attribute classification system can improve efficiency of operation. For example, the cognitive attribute classification system can decrease the number of network parameters, and in turn, the computational resources utilized in training and/or application. For example, by utilizing base localization neural network and commonly training attribute group classifiers, the cognitive attribute classification system can utilize fewer parameters relative to conventional systems. To illustrate, by training channels within the base localization neural network and/or their associated layers in combination with each other, the cognitive attribute classification system can avoid computationally expensive training and/or classification involved with multiple (i.e., separate) networks each trained independently to localize a unique attribute in a query image.

Furthermore, the cognitive attribute classification system can improve accuracy relative to conventional systems. Indeed, by applying a base localization neural network in conjunction with attribute group classifiers in a single network, the cognitive attribute classification system can identify accurate attribute classes, generate accurate tags, and/or provide accurate search results. For example, using the cognitive attribute classification system, a retailer administrative device can upload an entire catalog of images and automatically generate a high-resolution custom tag directory for fine-grain searching capability by customers. In addition, using the cognitive attribute classification system, a customer can provide a fine-grained search query and, in response, receive high quality search results and recommendations that are relevant to the search query. Accordingly, such improvements not only improve computer efficiency and classification accuracy as described above, but the cognitive attribute classification system can also improve user efficiency. Indeed, the cognitive attribute classification system can reduce time and user interactions via different user interfaces by providing more relevant search results/recommendations with fewer user inputs (e.g., without additional searching, scrolling, clicking, etc. to find proper responses to the initial search query).

As illustrated by the foregoing discussion, the present disclosure utilizes a variety of terms to describe features and advantages of the cognitive attribute classification system. Additional detail is now provided regarding these and other terms used herein. For example, as used herein, the term "query" refers to a request for data/information. In particular, a query can include a request for a tag in association with an image (e.g., a query image) or a request for similar or recommended items relative to a digital image. For instance, the query can include a tag query to determine one or more tags in association with a digital image or a batch of digital images (e.g., an online catalog of images). In another example, the query can include a search query with a query image and/or additional information (e.g., a search query to find pants similar to those in a query image but with dark denim and red stitching instead of faded denim with white stitching as shown in the query image). Relatedly, the term "digital image" as used herein refers to a digital visual representation. A digital image includes a digital element comprised of pixels that portray a visual representation of an object (e.g., an item, product, person, thing, etc.).

Further, as used herein, the term "attribute" refers to one or more properties, features, and/or characteristics of a digital image and/or item. In particular, an attribute can define one or more aspects of an object portrayed in a query image. Additionally, the term "attribute group" as used herein refers to a category, class, or type of attributes. In particular, an attribute group can include a category of attributes that describes or encompasses a plurality of attributes. For example, an attribute group can include a sleeve type, and attributes within the attribute group of sleeve type can include three-quarter sleeve, spaghetti, sleeveless, elbow, extra long, extra short, long short, strapless, etc.

Based on predicted attributes associated with an attribute score (e.g., a measure of probability that an attribute is associated with a query image, for example, compared to a ground truth attribute), the cognitive attribute classification system can, among other things, generate tags. As used herein, the term "tag" refers to a data identifier (e.g., metadata ascribing a keyword or term to a piece of information). For example, the cognitive attribute classification system can generate one or more tags corresponding to predicted attributes of a query image.

Additionally, as used herein, the term "neural network" refers to a machine learning model that can be tuned (e.g., trained) based on inputs to approximate unknown functions. In particular, the term neural network can include a model of interconnected artificial neurons (e.g., organized in layers) that communicate and learn to approximate complex functions and generate outputs based on a plurality of inputs provided to the model. For instance, the term neural network includes one or more machine learning algorithms. In addition, a neural network can refer to an algorithm (or set of algorithms) that implements deep learning techniques that utilize a set of algorithms to model high-level abstractions in data. To illustrate, a neural network can include a convolutional neural network, a recurrent neural network, a generative adversarial neural network, and/or a graph neural network Relatedly, the terms "base localization neural network," "attribute group classifier," and "cognitive attribution neural network" refer to different types of neural networks. In particular, the base localization neural network can include interleaved neural network layers for localizing attributes of an object portrayed in a digital image. The interleaved neural network layers are arranged, in some embodiments, in alternating fashion. As used herein, the term "alternating" refers to occurrences, usage, implementation, etc. arranged in turns or succession to each other. In particular, the base localization neural network can utilize an alternating arrangement of a first layer (e.g., an inception layer) followed by a second layer (e.g., a dilated convolution layer).

In addition, the attribute group classifier can include neural network layers for predicting an attribute associated with a query image (e.g., based on one or more outputs of the base localization neural network). Further, the cognitive attribution neural network can include both the base localization neural network and one or more attribute group classifiers to intelligently generate tags for a query image, surface items similar to an object of the query image, and/or recommend items based on the query image.

As used herein, the terms "localization feature vector" and "localization feature embedding" refer to representations of information regarding properties or features for a particular set of data. In particular, an "attribute localization feature vector" or "localization feature vector" (for short) can include a vector representation of data corresponding to a localized attribute of an object portrayed in a query image. In addition, the localization feature embedding can include a portion of the localization feature vector that corresponds to a particular attribute group (e.g., a first localization feature embedding for a sleeve and a second localization feature embedding for a neckline).

Further, as used herein, the terms "dilated convolution layer" and "inception layer" refer to specific example layers within the base localization neural network. In particular, the dilated convolution layer can include a convolution layer applied to an input with defined gaps (e.g., a query image with attributes having some spatial relationship relative to one another). By employing a dilated convolution layer, the cognitive attribute classification system can increase a receptive view (e.g., a global view) of the base localization neural network and parameter accretion. In addition, the inception layer can include, for example, an inception v1 layer, an inception v2 layer, an inception v3 layer, an inception v4 layer, and/or an inception Res-Net layer (e.g., to help optimize speed and accuracy of the base localization neural network).

As also used herein, the term "grid search network" refers to a model for utilizing grid-searching as a process of scanning data to configure optimal parameters for a given model. In particular, the grid search network can generate grid-search feature vectors (e.g., vector representations of data) corresponding to a query image and candidate answer matches for the query image. The cognitive attribute classification system can perform a similarity analysis on the grid-search feature vectors in "similarity space," which can be referred to as a vector space where Euclidean distance between grid-search feature vectors is reflective of similarity therebetween.

In addition, as used herein, the term "channel" refers to a sequence or chain of neural network layers. In particular, the cognitive attribute classification system can utilize a plurality of channels within the base localization neural network such that each channel of the plurality of channels corresponds to a unique attribute group. For example, a first channel can correspond to an attribute group of collar type and a second channel can correspond to an attribute group of pocket type.

In addition, as used herein, the term "train" refers to utilizing information to tune or teach a machine learning model. The term "training" (used as an adjective or descriptor, such as "training query" or "training query image") refers to information or data utilized to tune or teach a machine learning model. In some embodiments, the cognitive attribute classification system trains a base localization neural network and one or more attribute group classifiers based on training query images predetermined to be associated with ground truth attributes. By training these machine learning models, the cognitive attribute classification system can update one or more parameters such as base-localization neural network parameters of the base localization neural network and attribute-group classifier parameters of the one or more attribute group classifiers.

In particular, the cognitive attribute classification system can utilize a "classification loss" (e.g., a loss output that, when output from a loss function, represents the difference between a predicted attribute and a ground truth attribute) to update parameters and more accurately predict attributes corresponding to query images. Examples of loss functions to generate the classification loss can include a regression loss function (e.g., a mean square error function, a quadratic loss function, an L2 loss function, a mean absolute error/L1 loss function, mean bias error, etc.). Additionally or alternatively, the loss function can include a classification-type loss function (e.g., a hinge loss/multi-class SVM loss function, cross entropy loss/negative log likelihood function, etc.).

Additional detail will now be provided regarding the cognitive attribute classification system in relation to illustrative figures portraying example embodiments and implementations of the cognitive attribute classification system. For example, FIG. 1 illustrates a computing system environment (or "environment") 100 for implementing a cognitive attribute classification system 106 in accordance with one or more embodiments. As shown in FIG. 1, the environment 100 includes server(s) 102, a client device 108, an administrator device 112, and a network 116. Each of the components of the environment 100 can communicate via the network 116, and the network 116 may be any suitable network over which computing devices can communicate. Example networks are discussed in more detail below in relation to FIG. 10.

As shown in FIG. 1, the environment 100 includes the client device 108. The client device 108 can be one of a variety of computing devices, including a smartphone, tablet, smart television, desktop computer, laptop computer, virtual reality device, augmented reality device, or other computing device as described in relation to FIG. 10. Although FIG. 1 illustrates a single client device 108, in some embodiments the environment 100 can include multiple client devices 108. The client device 108 can further communicate with the server(s) 102 via the network 116. For example, the client device 108 can receive user input and provide information pertaining to the user input (e.g., that relates to a query image) to the server(s) 102.

As shown, the client device 108 includes a corresponding client application 110. In particular, the client application 110 may be a web application, a native application installed on the client device 108 (e.g., a mobile application, a desktop application, etc.), or a cloud-based application where part of the functionality is performed by the server(s) 102. The client application 110 can present or display information to a user associated with the client device 108, including information that is responsive to a query (e.g., a query image). In addition, the user can interact with the client application 110 to provide user input to, for example, access search results and/or recommendations in response to a previous user input comprising a query image.

As mentioned, the environment 100 includes the administrator device 112. The administrator device 112 can include a variety of computing devices as described in relation to FIG. 10. The administrator device 112 can generate and/or provide information regarding query images, such as a batch of query images in a product catalog. Although FIG. 1 illustrates a single administrator device 112, in some embodiments the environment 100 can include multiple different administrator devices 112. The administrator device 112 can further communicate with the server(s) 102 via the network 116 through an administrator application 114. Similar to the client application 110, the administrator application 114 may be a web application, a native application installed on the administrator device 112 (e.g., a mobile application, a desktop application, etc.), or a cloud-based application where part of the functionality is performed by the server(s) 102. For example, the administrator device 112 can receive user input via the administrator application 114 and provide information pertaining to the user input (e.g., for tagging a database or catalog of query images) to the server(s) 102.

As illustrated in FIG. 1, the environment 100 includes the server(s) 102. The server(s) 102 may learn, generate, store, receive, and transmit electronic data, such as executable instructions for determining an attribute of a query image, generating a tag that corresponds to the attribute of the query image, and/or providing search results/recommendations based on the query image. For example, the server(s) 102 may receive data from the client device 108 based on user input to provide a query image. In turn, the server(s) 102 can transmit data (e.g., based on tags corresponding to predicted attributes of the query image) to one or more components in the environment 100. For example, the server(s) 102 can send to the client device 108 a set of search results and/or recommendations of products similar to that portrayed in the query image. Similarly, for example, the server(s) 102 may receive data from the administrator device 112 based on user input to upload a database of query images for onboarding a product catalog. In turn, the server(s) 102 can transmit data back to the administrator device 112 and/or third-party server (e.g., a web host server). For instance, the server(s) 102 can send to the administrator device 112 a database of tags corresponding to the uploaded database of query images.

In these or other embodiments, the server(s) 102 can communicate with the client device 108 and the administrator device 112 to transmit and/or receive data via the network 116. In some embodiments, the server(s) 102 comprises a content server and/or a data collection server. The server(s) 102 can also comprise an application server, a communication server, a web-hosting server, a social networking server, or a digital content management server.

Although FIG. 1 depicts the cognitive attribute classification system 106 located on the server(s) 102, in some embodiments, the cognitive attribute classification system 106 may be implemented by on one or more other components of the environment 100 (e.g., by being located entirely or in part at one or more of the other components). For example, cognitive attribute classification system 106 may be implemented by the client device 108, the administrator device 112, and/or a third-party device.

As shown in FIG. 1, the cognitive attribute classification system 106 is implemented as part of a content management system 104 located on the server(s) 102. The content management system 104 can organize, manage, and/or execute handling of query images. For example, the content management system 104 can identify search queries, tag queries, etc. and direct the cognitive attribute classification system 106 to respond accordingly. The content management system 104 can also send attribute classification data to one or more components of the environment 100 for generating tags and/or providing content to send to the client device 108 via the network 116.

In some embodiments, though not illustrated in FIG. 1, the environment 100 may have a different arrangement of components and/or may have a different number or set of components altogether. For example, the environment 100 may include a third-party server (e.g., for storing attribute classification data or other data). As another example, the client device 108 and/or the administrator device 112 may communicate directly with the cognitive attribute classification system 106, bypassing the network 116.

Figure 2:
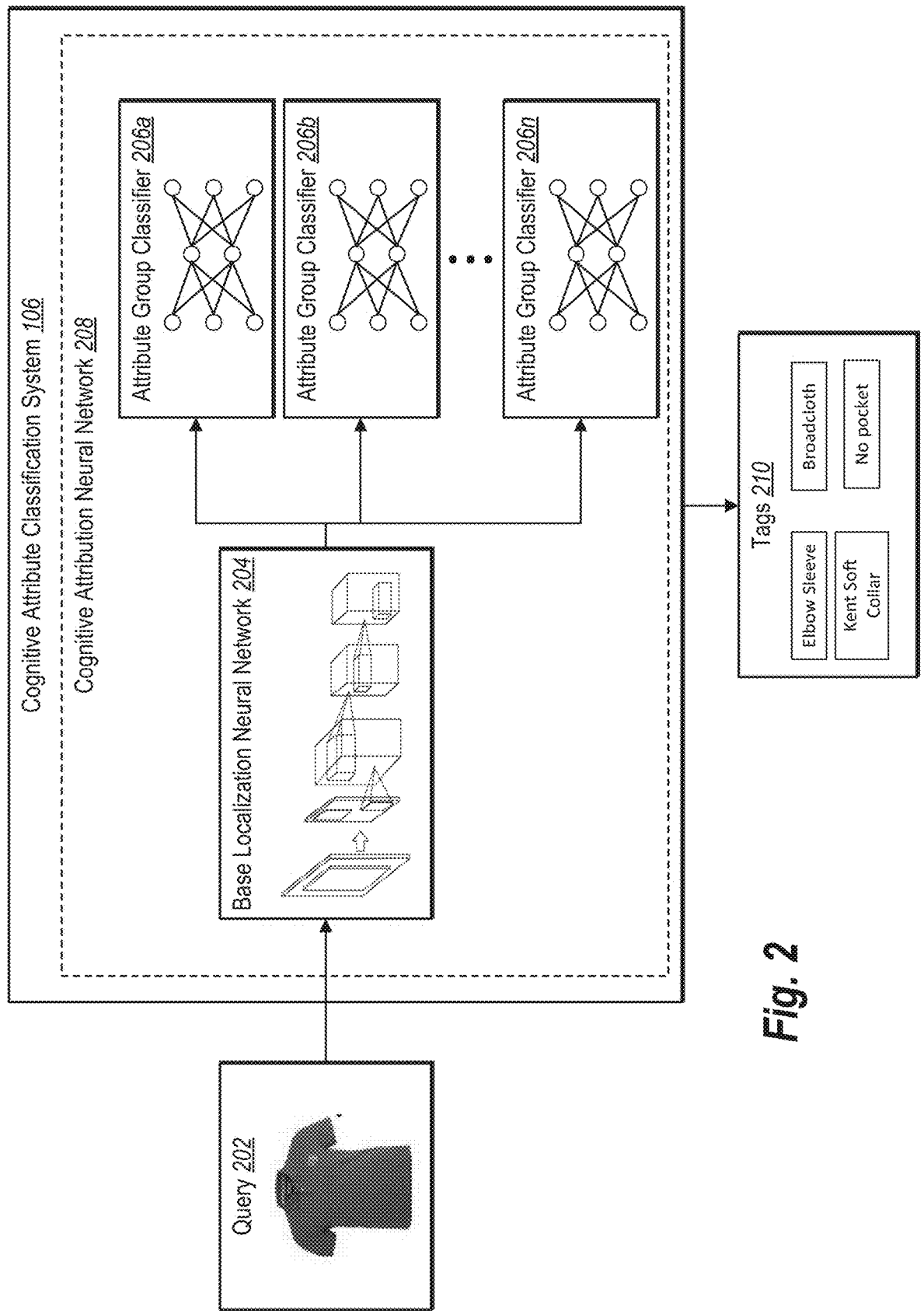
FIG. 2 illustrates a schematic diagram by which the cognitive attribute classification system generates tags associated with a query in accordance with one or more embodiments.

As mentioned above, the cognitive attribute classification system 106 can generate tags based on attributes of an object portrayed in a digital image. FIG. 2 illustrates a schematic diagram of the cognitive attribute classification system 106 generating tags 210 associated with a query 202, in accordance with one or more embodiments of the present disclosure. As shown, the cognitive attribute classification system 106 utilizes a cognitive attribution neural network 208 that receives the query 202 as an input and generates the tags 210 as a corresponding output. By utilizing the cognitive attribution neural network 208, the cognitive attribute classification system 106 can generate the tags 210 tied to the object (e.g., the shirt) portrayed in the query 202 with increased levels of accuracy and resolution. In turn, a retailer can, for example, update a product catalog to include the tags 210 associated with the object portrayed in the query 202, and/or a customer can perform fine-grained product searching based on the tags 210.

As shown in FIG. 2, the cognitive attribution neural network 208 can receive a query 202 (e.g., a query image as part of a tag query, search query, etc.). In turn, the base localization neural network 204 localizes properties/features of the object in the query 202. In particular, the base localization neural network 204 utilizes an architecture of interleaved neural network layers (described in more detail below in conjunction with FIGS. 3A, 3C, and 3D). The base localization neural network 204 can apply alternating dilated convolution layers and inception layers to identify regions or portions of the digital image pertinent to various attributes. For example, a first neural network channel in the base localization neural network 204 can determine pixels or regions to emphasize in relation to determining an attribute group of "collar type." Similarly, a second neural network channel in the base localization neural network 204 can determine pixels or regions to emphasize for a second attribute group of "sleeve type." Thus, in some embodiments, the cognitive attribution neural network 208 can utilize the base localization neural network 204 to identify the properties/features at various portions of the object portrayed in the query 202 and output data descriptive of such properties/features, namely a localization feature vector.

The cognitive attribution neural network can then utilize the localization feature vector to determine attributes or classes for different attribute groups. For example, as shown in FIG. 2, the cognitive attribution neural network 208 can apply one or more of the attribute group classifiers 206a-206n to the localization feature vector (or a portion of the localization feature) generated by the base localization neural network 204. Further, each of the attribute group classifiers 206a-206n can predict one or more attributes corresponding to an attribute group.

For example, with regard to an example digital image that portrays a shirt, the attribute group classifier 206a can predict attributes of the example attribute group of gender (e.g., male or female); the attribute group classifier 206b can predict attributes of the example attribute group of collar type (e.g., straight point, semi spread, cutaway, spread, etc.); another attribute group classifier can predict attributes of the example attribute group of sleeve type (e.g., long sleeve, elbow sleeve, short sleeve, tank top, etc.); yet another attribute group classifier can predict attributes of the example attribute group of pocket type; still another attribute group classifier can predict attributes of the example attribute group of texture type; another attribute group classifier can predict attributes of the example attribute group of neckline type (e.g., v-neck, crew, scoop, etc.); and so forth.

Based on the predicted attributes from the attribute group classifiers 206a-206n, the cognitive attribution neural network 208 can generate corresponding tags 210 for the object portrayed in the query 202. Some example tags 210, as illustrated, can include "Kent soft collar"; "short sleeve"; "no pocket"; and "broadcloth." Thus, in some embodiments, a collar attribute group classifier of the attribute group classifiers 206a-206n can predict "Kent soft collar"; a sleeve attribute group classifier predict "elbow sleeve"; and a pocket attribute group classifier can predict "no pocket"; a texture attribute group classifier can predict "broadcloth." Other classifiers or a combination of classifiers of the attribute group classifiers 206a-206n can predict attributes of the object in the query 202 that correspond to the above-mentioned tags 210 and/or other tags 210 not expressly illustrated or described.

Figure 3A:
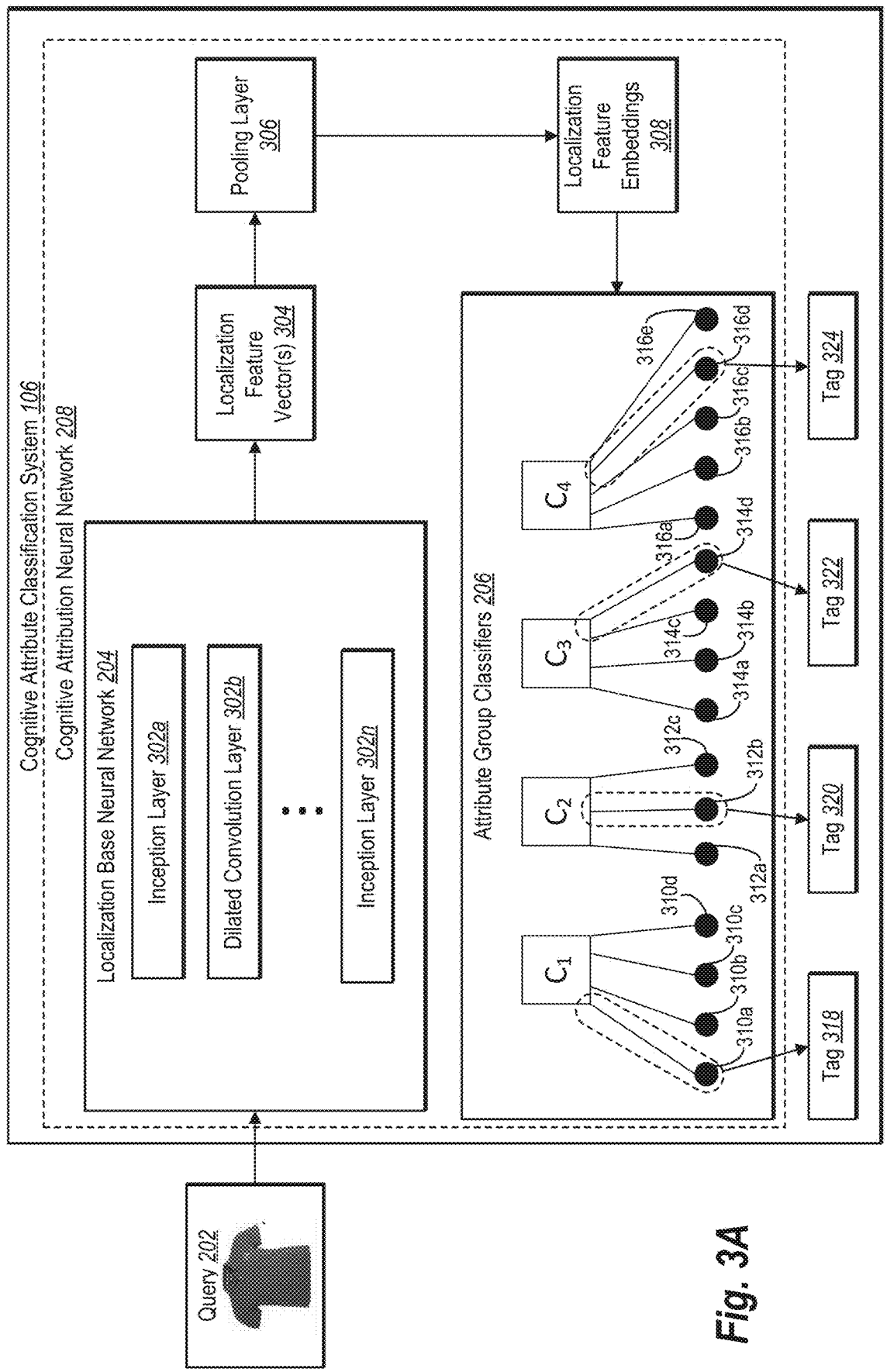
FIG. 3A illustrates another schematic diagram by which the cognitive attribute classification system generates tags associated with a query in accordance with one or more embodiments.

As mentioned above, the cognitive attribute classification system 106 can generate tags based on attributes of an object portrayed in a digital image. FIG. 3A illustrates a schematic diagram by which the cognitive attribute classification system 106 generates tags 318-324 associated with a query 202, in accordance with one or more embodiments of the present disclosure. As shown, the cognitive attribute neural network 208 receives the query 202 and generates predicted attributes 310a-310d, 312a-312c, 314a-314d, and 316a-316e. By utilizing the cognitive attribute neural network 208, the cognitive attribute classification system 106 can generate the tags 318-324 tied to the object (e.g., the shirt) portrayed in the query 202 with increased levels of accuracy and resolution. Specifically, the cognitive attribute classification system 106 can select an attribute from within each group of predicted attributes based on an attribute score (e.g., having a highest attribute score as described in more detail below). In turn, a retailer can, for example, update a product catalog to include the tags 318-324 associated with the object portrayed in the query 202, and/or a customer can perform fine-grained product searching based on the tags 318-324. Additional detail is now provided, particularly with respect to the cognitive attribute neural network 208 that includes, as illustrated in FIG. 3, the base localization neural network 204, a pooling layer 306, and the attribute group classifiers 206 (e.g., the attribute group classifiers 206a-206n from FIG. 2).

As just mentioned, the cognitive attribute neural network 208 can receive the query 202 (e.g., a query image as part of a tag query, search query, etc.) and utilize the base localization neural network 204 to localize properties/features of the object in the query 202. In particular, the base localization neural network 204 can utilize an architecture of alternating neural network layers 302a-302n that comprise, in this example embodiment, an inception layer 302a, a dilated convolution layer 302b, and so forth in alternating fashion to an inception layer 302n. In so doing, the cognitive attribute classification system 106 can localize multiple properties/features (and hence multiple attributes) for the object portrayed in the query 202 within a single network. Then, as mentioned above in conjunction with FIG. 2, the base localization neural network 204 can generate a localization feature vector 304 that represents the properties/features identified in the object portrayed in the query 202.

As further shown in FIG. 3A, the cognitive attribute classification system 106 can apply the pooling layer 306 to the localization feature vector 304. As mentioned above, in some embodiments, the pooling layer 306 is a global average pooling layer. In some embodiments, a global average pooling layer determines an average for various channels or categories in a feature vector. In particular a global average pooling layer can determine the spatial average of feature maps from a localization feature vector for each channel (or dimension) of the localization feature vector. A global average pooling layer can reduce the spatial size of the localization feature vector 304 and control overfitting of the model.

Accordingly, by using the pooling layer 306, the cognitive attribute classification system 106 can reduce a spatial size of the localization feature vector 304 and generate one or more localization feature embeddings 308. For example, the cognitive attribute classification system 106 can apply to the pooling layer 306 the localization feature vector 304 with example dimensions of b×7×7×1024 (where b represents a batch size of query images in the query 202) in order to reduce the localization feature vector 304 to example dimension of b×1×1×1024.

As mentioned above, in some embodiments, the cognitive attribute classification system 106 can determine feature embeddings from a localization feature vector. Indeed, in some embodiments, the cognitive attribute classification system 106 utilizes a reduced localization feature vector (after applying the global pooling layer) as a feature embedding 308. In some embodiments, the cognitive attribute classification system 106 generates a single feature vector having a plurality of channels (or dimensions) corresponding to each classifier and utilizes the feature vector to generate a set of feature embeddings. In some embodiments, the cognitive attribute classification system 106 generates a set of feature vector (having a number corresponding to the number of classifiers) and utilizes the set of feature vectors to generate a set of feature embeddings.

As illustrate in FIG. 3, the cognitive attribute classification system 106 can apply the one or more localization feature embeddings 308 to the attribute group classifiers 206 for attribute classification. Additionally or alternatively, in some embodiments, the cognitive attribute classification system 106 can apply an embedding layer (e.g., prior to or in conjunction with the attribute group classifiers 206). For example, the cognitive attribute classification system 106 can apply a portion of the one or more localization feature embeddings 308 to an embedding layer such that each applied portion of the one or more localization feature embeddings 308 corresponds to a unique attribute group classifier of the attribute group classifiers 206 predicting respective attributes thereof. In some embodiments, the localization feature vector 304 (after application of global average pooling) is fed into an embedding layer.

At the attribute group classifiers 206, attribute group classifiers $C_1$-$C_4$ can utilize corresponding portions of the one or more localization feature embeddings 308 to generate, respectively, the predicted attributes 310a-310d, 312a-312c, 314a-314d, and 316a-316e. To do so, the attribute group classifiers $C_1$-$C_4$ may perform one or more acts and algorithms in parallel and/or in series with each other. In one example, $C_1$ can be a collar attribute group classifier and therefore use feature embedding corresponding to collar information in the one or more localization feature embeddings 308. Similarly, for instance, $C_2$ can be a neckline attribute group classifier and therefore use a portion pertaining to neckline information in the one or more localization feature embeddings 308. Further, as an example, $C_3$ can be a pocket attribute group classifier and therefore use a feature embedding pertaining to pocket information in the one or more localization feature embeddings 308. In addition, $C_4$ can be a gender attribute group classifier and therefore use a portion pertaining to gender information in the one or more localization feature embeddings 308.

Thus, based on respective portions of the one or more localization feature embeddings 308, the corresponding attribute group classifiers 206 can generate predicted attributes. Specifically, $C_1$ can generate predicted attributes 310a-310d; $C_2$ can generate predicted attributes 312a-312c; $C_3$ can generate predicted attributes 314a-314d; and $C_4$ can generate predicted attributes 316a-316e. In some embodiments, the predicted attributes 310a-310d, 312a-312c, 314a-314d, and 316a-316e correspond to each potential attribute (or class) in an attribute group (e.g., in a set of attributes or classes) that the respective attribute group classifiers 206 are configured or trained to predict. In other embodiments, the predicted attributes 310a-310d, 312a-312c, 314a-314d, and 316a-316e represent subsets of potential attributes classifiable by the respective attribute group classifiers 206 (e.g., the attributes with the top attribute scores). In either case, each of the attribute group classifiers 206 can generate an attribute score for the predicted attributes 310a-310d, 312a-312c, 314a-314d, and 316a-316e.

Based on a comparison of attribute scores for each set of the predicted attributes 310a-310d, 312a-312c, 314a-314d, and 316a-316e, the corresponding classifiers $C_1$-$C_4$ can select or predict an attribute for the object in the query 202. For example, in relation to FIG. 3, the cognitive attribute classification system 106 can select the attribute from each of the classifiers $C_1$-$C_4$ with the highest attribute score for each group of attributes as being associated with the object in the query 202. In turn, the cognitive attribute classification system 106 can use the selected attributes with the highest attribute scores (represented by predicted attributes 310a, 312b, 314d, and 316d encircled in a dotted line) to generate corresponding tags 318-324.

In these or other embodiments, the attribute group classifiers 206 can include more or fewer attribute group classifiers (e.g., depending on the number attribute groups to be classified). Additionally or alternatively, the attribute group classifiers 206 can include one or more components other than those expressly illustrated and described. For example, the attribute group classifiers 206 can include one or more fully connected layers, and can utilize the one or more fully connected layers to help determine the predicted attributes 310a-310d, 312a-312c, 314a-314d, and 316a-316e.

Figure 3B:
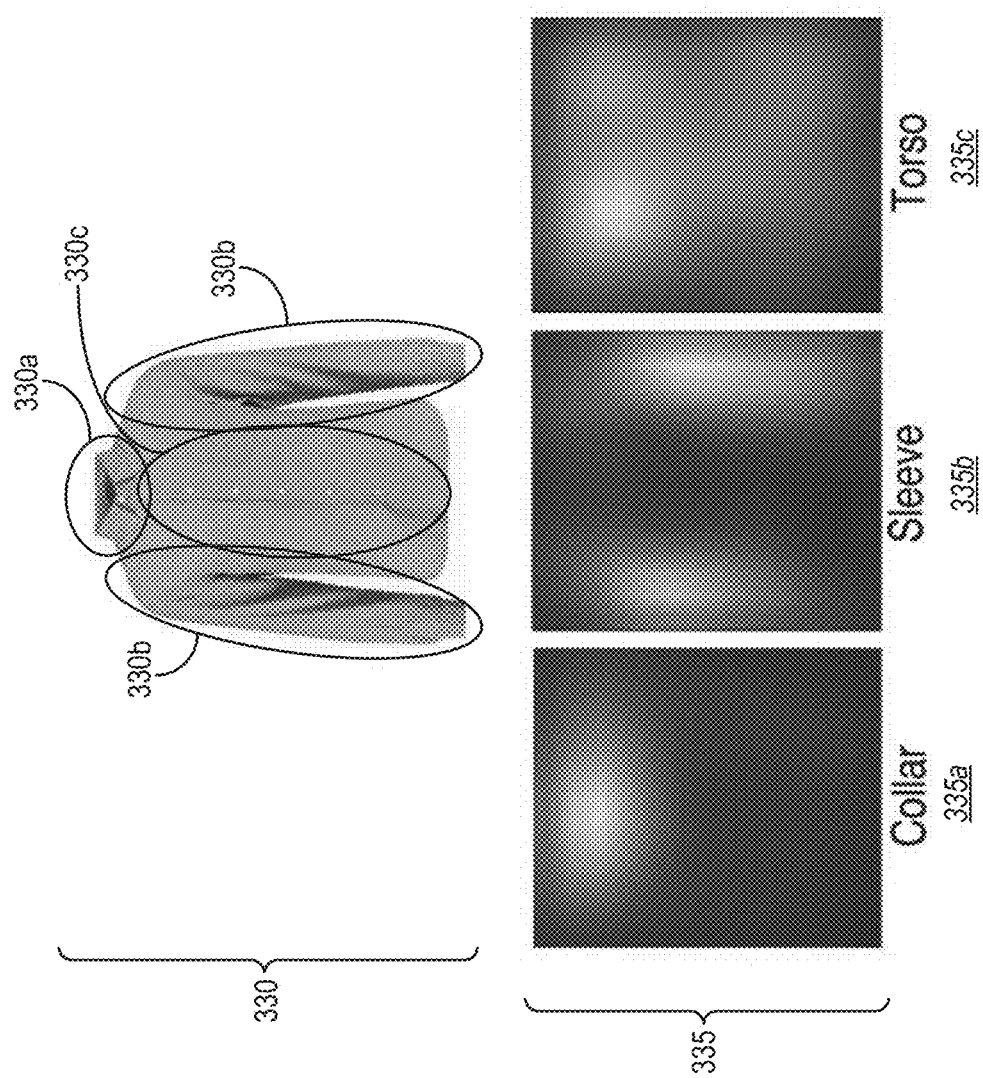
FIG. 3B illustrates an example query image and corresponding attribute maps in accordance with one or more embodiments.

As mentioned above, the base localization neural network 204 can localize properties/features of an object in a query image to generate attribute-specific information in a localization feature vector. FIG. 3B illustrates an example object 330 of a query image in relation to corresponding attribute maps 335 (or activation maps) representing attribute-specific information included in a localization feature vector and refined in a pooling layer such as a global average pooling layer, in accordance with one or more embodiments of the present disclosure. In particular, and as mentioned above, the interleaved neural network layers of the base localization neural network 204, including the dilated convolution layers and inception layers, in combination with a global average pooling layer can improve localization in attribute maps (e.g. localization embeddings), which can further enhance learning and classification of attributes.

Thus, as shown, the base localization neural network 204 can generate a collar attribute map 335a that emphasizes a top portion 330a of the object, a sleeve attribute map 335b that emphasizes side portions 330b, and a torso attribute map 335c that emphasizes a central portion 330c. As illustrated, application of a global average pooling layer in conjunction with a base localization neural network allows for better localization in attribution maps, resulting in the cognitive attribution neural network learning more robust attribute-specific embeddings.

Figure 3C:
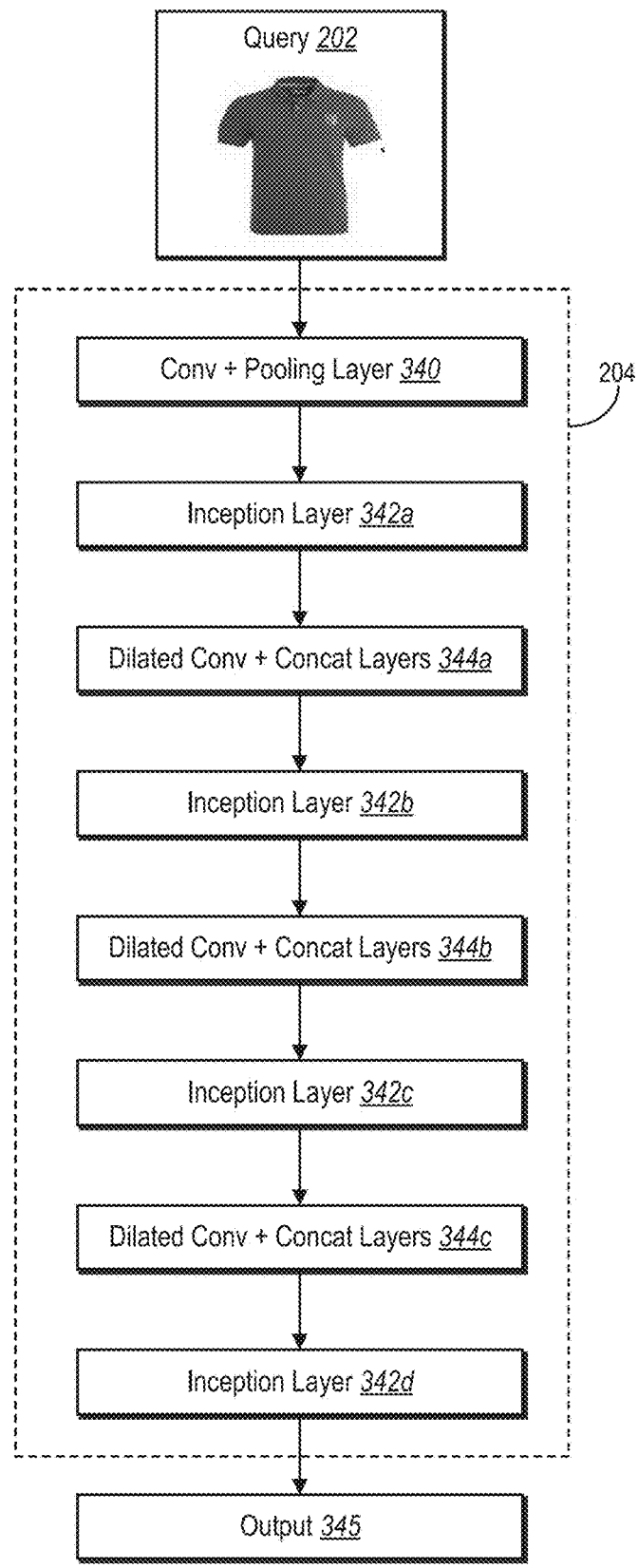
FIG. 3C illustrates an example architecture of layers within a base localization neural network in accordance with one or more embodiments.

As mentioned above, the base localization neural network 204 can include interleaved layers of inception layers and dilated convolution layers. FIG. 3C illustrates an example architecture of layers within the base localization neural network 204 in accordance with one or more embodiments of the present disclosure. In particular, FIG. 3C illustrates the object in the query 202 as an input to the base localization neural network 204, which generates output 345. In some embodiments, the output 345 can include the localization feature vector and/or localization feature embeddings described above. To generate the output 345, the cognitive attribute classification system 106 applies the query 202 to the base localization neural network 204 that, in this example embodiment, includes a convolution+pooling layer 340 (e.g., for image recognition analysis and/or sizing). As further shown, the base localization neural network 204 includes inception layers 342a-342d that alternate with dilated convolution layers 344a-344c to perform the acts described above.

Figure 3D:
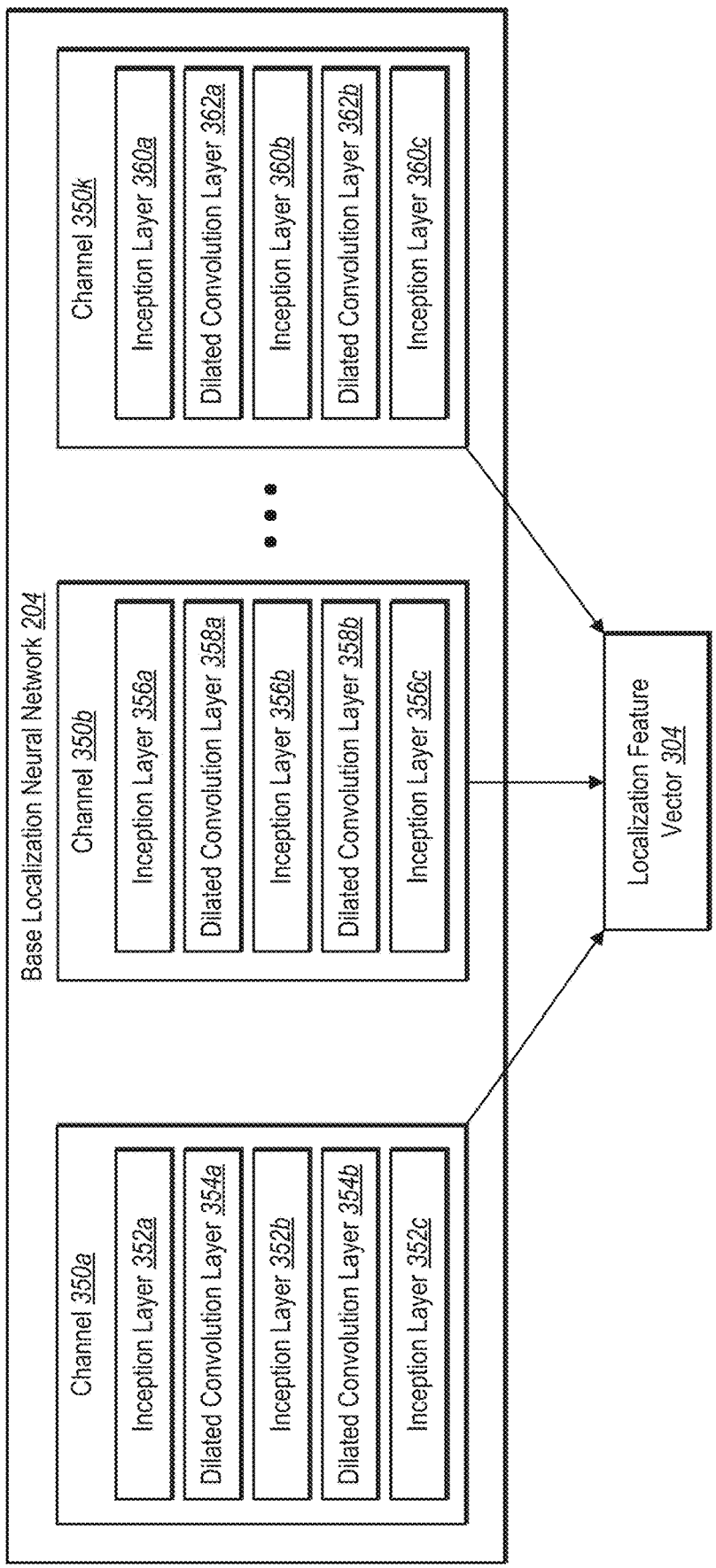
FIG. 3D illustrates an example architecture of layers and channels within a base localization neural network in accordance with one or more embodiments.

FIG. 3D illustrates yet another example architecture of neural network layers and channels 350a-350k within the base localization neural network 204 in accordance with one or more embodiments of the present disclosure. By using multiple channels within a single network, the cognitive attribute classification system 106 can localize multiple properties/feature of an object in a query image for determining multiple attributes. In particular, the cognitive attribute classification system 106 can associate each of the channels 350a-350k with a respective attribute group (e.g., collar, gender, pocket, neckline, texture, etc.). Thus, the channel 350a with inception layers 352a-352c and dilated convolution layers 354a-354b can correspond to, for example, a collar attribute group and therefore localize properties/features of an object in a query image that are tied to collar data. Similarly, the channel 350b with inception layers 356a-356c and dilated convolution layers 358a-358b can correspond to, for example, a gender attribute group and therefore localize properties/features of the object in the query image that are tied to gender data, and so forth to the $k^{th}$ channel 350k. The channel 350k can include inception layers 360a-360c and dilated convolution layers 362a-362b, and can further correspond to, for example, a neckline attribute group and therefore localize properties/features of the object in the query image that are tied to neckline data. Then, based on data generated by each of the channels 350a-350k, the base localization neural network 204 can output the localization feature vector 304 described above that includes the respective portions from each channel.

Figure 4:
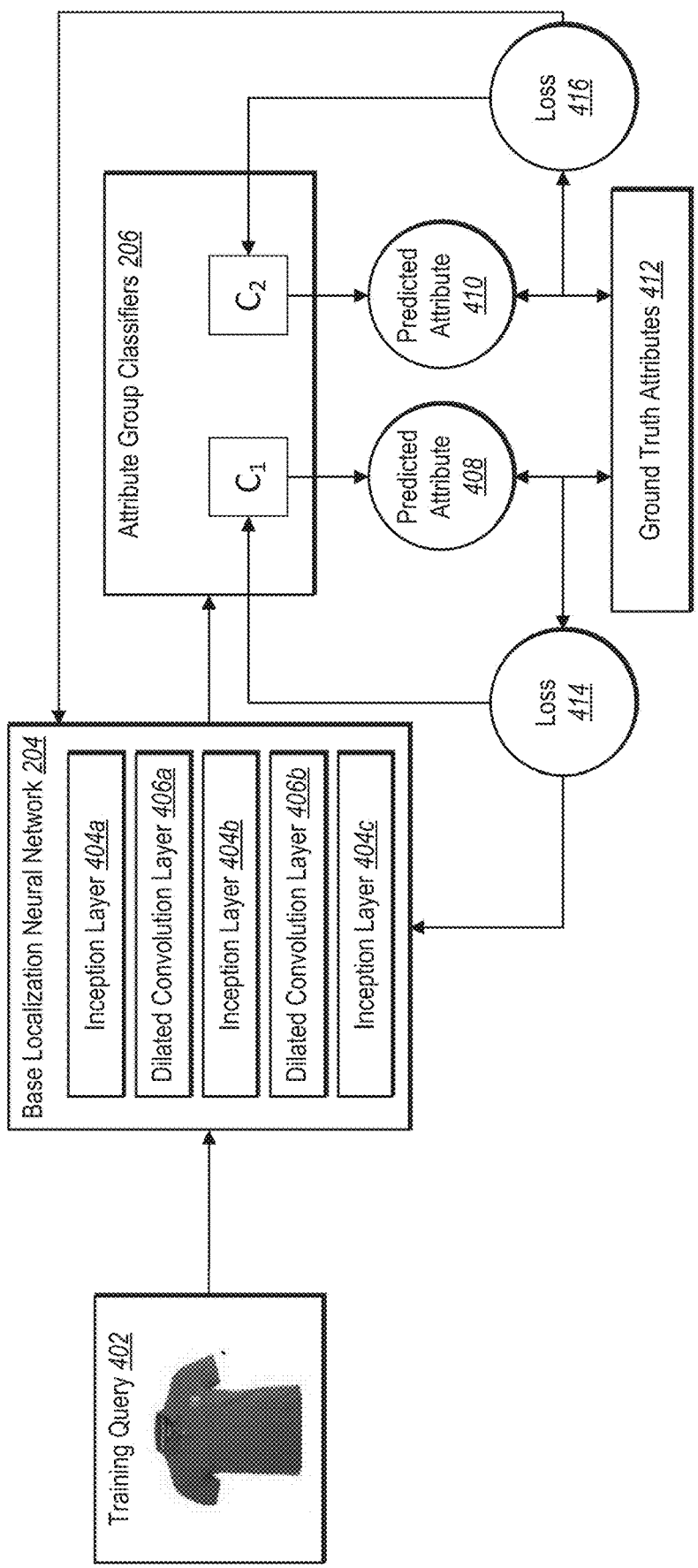
FIG. 4 illustrates an example process flow for training a cognitive attribution neural network in accordance with one or more embodiments.

As mentioned above, the cognitive attribute classification system 106 can train the base localization neural network 204 and the attribute group classifiers 206 such that the cognitive attribute classification system 106 can easily and adaptively add additional attribute groups/attributes to classify without training new/separate networks. FIG. 4 illustrates a training diagram illustrating an example training process for the base localization neural network 204 and the attribute group classifiers 206 in accordance with one or more embodiments of the present disclosure. To obtain training data (e.g., training queries and ground truth attributes), the cognitive attribute classification system 106 can scrape open-source datasets and metadata from websites to collect images and generate attribute groups. In some embodiments, the cognitive attribute classification system 106 can also access training data from a third-party (e.g., a repository of training data) or generate training data utilizing an alternative approach (e.g., crowd-sourcing or utilizing a ground truth labeling application with corresponding labeling users). With training data obtained, FIG. 4 shows the cognitive attribute classification system 106 applying the base localization neural network 204 to a training query 402. As shown, the base localization neural network 204 includes interleaved neural network layers comprising inception layers 404a-404c and dilated convolution layers 406a-406b.

The cognitive attribute classification system 106 then apply the attribute group classifiers 206 with attribute group classifiers $C_1$ and $C_2$ to the output generate by the base localization neural network 204. In turn, the attribute group classifiers $C_1$ and $C_2$ generate respective predicted attributes 408, 410, which the cognitive attribute classification system 106 compares to ground truth attributes 412. For example, the cognitive attribute classification system 106 can compare the predicted attributes 408, 410 with the ground truth attributes 412 by applying a loss function.

Based on the comparison of the predicted attributes 408, 410 with the ground truth attributes 412, the cognitive attribute classification system 106 can determine respective losses 414, 416. In more detail, the loss 414 can include the difference between the predicted attribute 408 and one or more ground truth attributes 412 associated with an attribute group that the attribute group classifier $C_1$ classifies. Likewise, the loss 416 can include the difference between the predicted attribute 410 and one or more ground truth attributes 412 associated with an attribute group that the attribute group classifier $C_2$ classifies.

Utilizing the losses 414, 416, the cognitive attribute classification system 106 can update one or more parameters of the base localization neural network 204 and the attribute group classifiers 206 (e.g., using backpropagation algorithms, a gradient descent optimization algorithm, an Adam optimizer algorithm, etc.). For example, the cognitive attribute classification system 106 can apply the loss 414 to the corresponding attribute group classifier $C_1$ to update learned parameters that include learned $C_1$ attribute-group classifier parameters. Similarly, for instance, the cognitive attribute classification system 106 can apply the loss 416 to the corresponding attribute group classifier $C_2$ to update learned parameters that include learned $C_2$ attribute-group classifier parameters.

Further, the cognitive attribute classification system 106 can update one or more learned parameters of the base localization neural network 204 that include learned base-localization neural network parameters. In some embodiments, the cognitive attribute classification system 106 applies all losses (e.g., both losses 414, 416) across channels of the base localization neural network 204 (e.g., channels 350a-350k described above in conjunction with FIG. 3D) for updating learned base-localization neural network parameters. Alternatively, in some embodiments, the cognitive attribute classification system 106 applies individual losses to corresponding channels of the base localization neural network 204. For example, the cognitive attribute classification system 106 can apply the loss 414 to a first channel of the base localization neural network 204 for updating learned base-localization neural network parameters specific to the first channel. In addition, the cognitive attribute classification system 106 can apply the loss 416 to a second channel of the base localization neural network 204 for updating learned base-localization neural network parameters specific to the second channel, and so forth for each loss and corresponding channel in the base localization neural network 204.

Figure 5A:
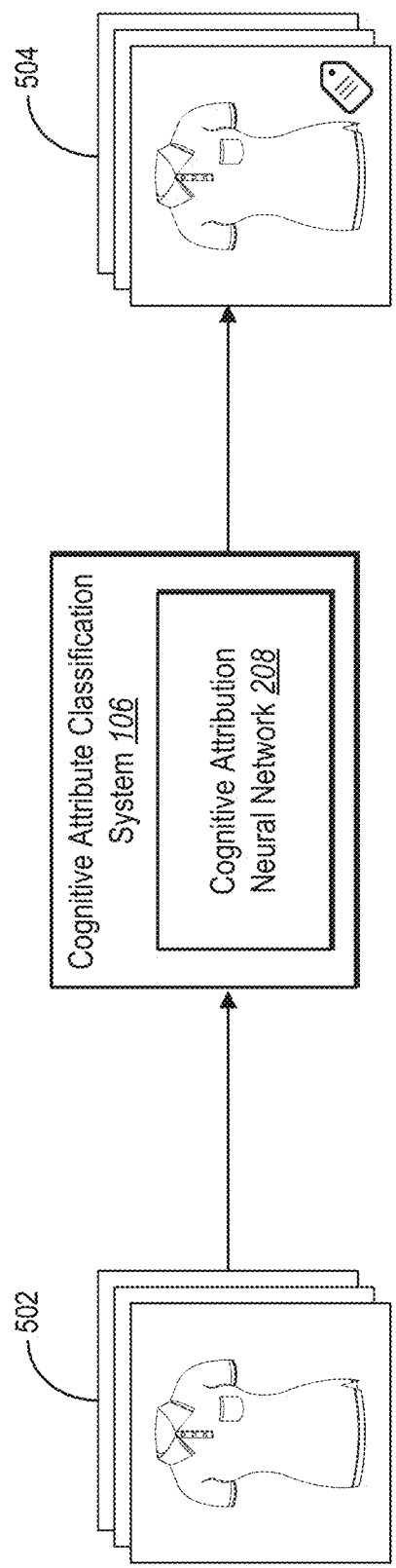
FIG. 5A illustrates a batch of catalog images in a tag query for tagging at the cognitive attribute classification system in accordance with one or more embodiments.

As mentioned above, the cognitive attribute classification system 106 can receive a database of images (e.g., from a retailer) for generating tags to be associated with the images. FIG. 5A illustrates a batch of catalog images 502 in a tag query (i.e., tag request) for tagging utilizing cognitive attribution neural network 208 of the cognitive attribute classification system 106 in accordance with one or more embodiments of the present disclosure. In particular, FIG. 5A illustrates an example use case in which a retailer can use the cognitive attribute classification system 106 to onboard a product database with product images to include accurate, detailed tags that are searchable (e.g., by the retailer and/or customers). For example, the cognitive attribute classification system 106 can receive the batch of catalog images 502 and output a batch of tagged catalog images 504 as illustrated. In some embodiments, the batch of tagged catalog images 504 can include the same files as included in the batch of catalog images 502 but with the addition of tags. In other embodiments, the batch of tagged catalog images 504 can include a customizable results database with rows and columns and/or searchable/filterable information (including one or more tags for each image).

Accordingly, a retailer need not undergo the exorbitant computer expense and time of having individual client devices apply tags to the individual images in the batch of catalog images 502. Rather, a retailer device can provide the batch of catalog images 502 to the cognitive attribute classification system 106 to generate a catalog of accurate, tagged digital images that can easily and dynamically searched.

Figure 5B:
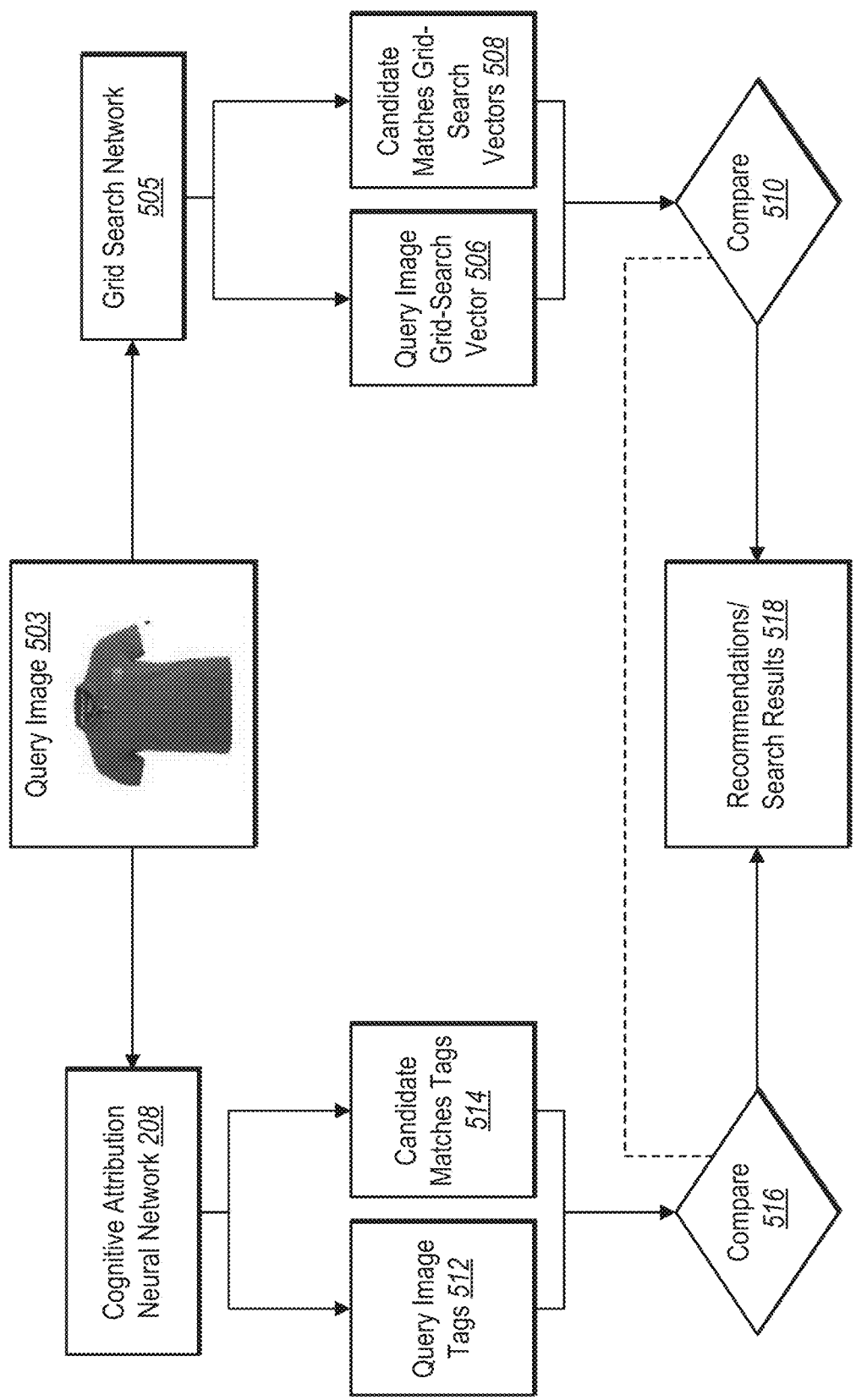
FIG. 5B illustrates a query image of a search query for tagging and/or generating recommendations/search results in accordance with one or more embodiments.

As also mentioned above, the cognitive attribute classification system 106 can receive a search query with a query image for generating search results and/or recommendations. FIG. 5B illustrates a query image 503 of a search query for tagging and/or generating recommendations/search results 518 in accordance with one or more embodiments of the present disclosure. In particular, FIG. 5B illustrates an example use case in which a customer can use the cognitive attribute classification system 106 for visual-based searches (i.e., image-based searches) to find a product the same as or similar to what is portrayed in the query image 503. Additionally or alternatively, the cognitive attribute classification system 106 can generate customer-specific recommendations based on the query image 503.

For example, the cognitive attribute classification system 106 can receive the query image 503 and apply the query image 503 to both the cognitive attribution neural network 208 and a grid search network 505. The grid search network 505 can generate a query image grid-search vector 506 that corresponds to the query image 503. In addition, the grid search network 505 can generate and/or search for previously generated candidate matches grid-search vectors 508 that correspond to candidate image matches potentially related to the query image 503.

At a compare block 510, the cognitive attribute classification system 106 can then cause the grid search network 505 to compare the query image grid-search vector 506 and the candidate matches grid-search vectors 508 in similarity space. In particular, for those of the candidate matches grid-search vectors 508 that fail to satisfy a threshold distance to the query image grid-search vector 506 in similarity space, the cognitive attribute classification system 106 can choose to deselect or otherwise remove these dissimilar corresponding candidate image matches such that the dissimilar candidate image matches are not surfaced to the user as part of the recommendations/search results 518.

As shown in FIG. 5, utilizing the cognitive attribution neural network 208, the cognitive attribution neural network 208 can generate and/or otherwise obtain query image tags 512 as described above. In addition, the cognitive attribution neural network 208 can generate and/or otherwise obtain candidate matches tags 514, where the candidate matches tags 514 (e.g., tags corresponding to candidate image matches) are determined in a same or similar manner to the query image tags 512. Then, at a compare block 516, the cognitive attribute classification system 106 can cause the cognitive attribution neural network 208 to compare the query image tags 512 and the candidate matches tags 514. In particular, for candidate image matches corresponding to those of the candidate matches tags 514 that do not satisfy a threshold similarity based on tags, the cognitive attribute classification system 106 can choose to deselect or otherwise remove these dissimilar corresponding candidate image matches such that the dissimilar candidate image matches are not surfaced to the user as part of the recommendations/search results 518.

Thus, in some embodiments, the recommendations/search results 518 are based on both tags and grid-search vectors for the query image 503 and candidate image matches (e.g., based on the query image tags 512, the candidate matches tags 514, the query image grid-search vector 506, and the candidate matches grid-search vectors 508). Additionally or alternatively, the cognitive attribute classification system 106 can account for the compare block 510 when comparing the query image tags 512 and the candidate matches tags 514 at the compare block 516 (as denoted by the dotted line connecting the compare blocks 510 and 516). For example, the cognitive attribute classification system 106 may use the compare block 510 to filter additional candidate image matches that satisfied the threshold similarity based on tags, but did not satisfy the threshold similarity based in similarity space of the grid search network 505. Additionally or alternatively, the cognitive attribute classification system 106 can account for the compare block 516 when comparing the query image grid-search vector 506 and the candidate matches grid-search vectors 508 at the compare block 510 (as denoted by the dotted line connecting the compare blocks 510 and 516). For example, the cognitive attribute classification system 106 may use the compare block 516 to filter additional candidate image matches that satisfied the threshold similarity based in similarity space of the grid search network 505, but did not satisfy the threshold similarity based on tags.

Figure 6A:
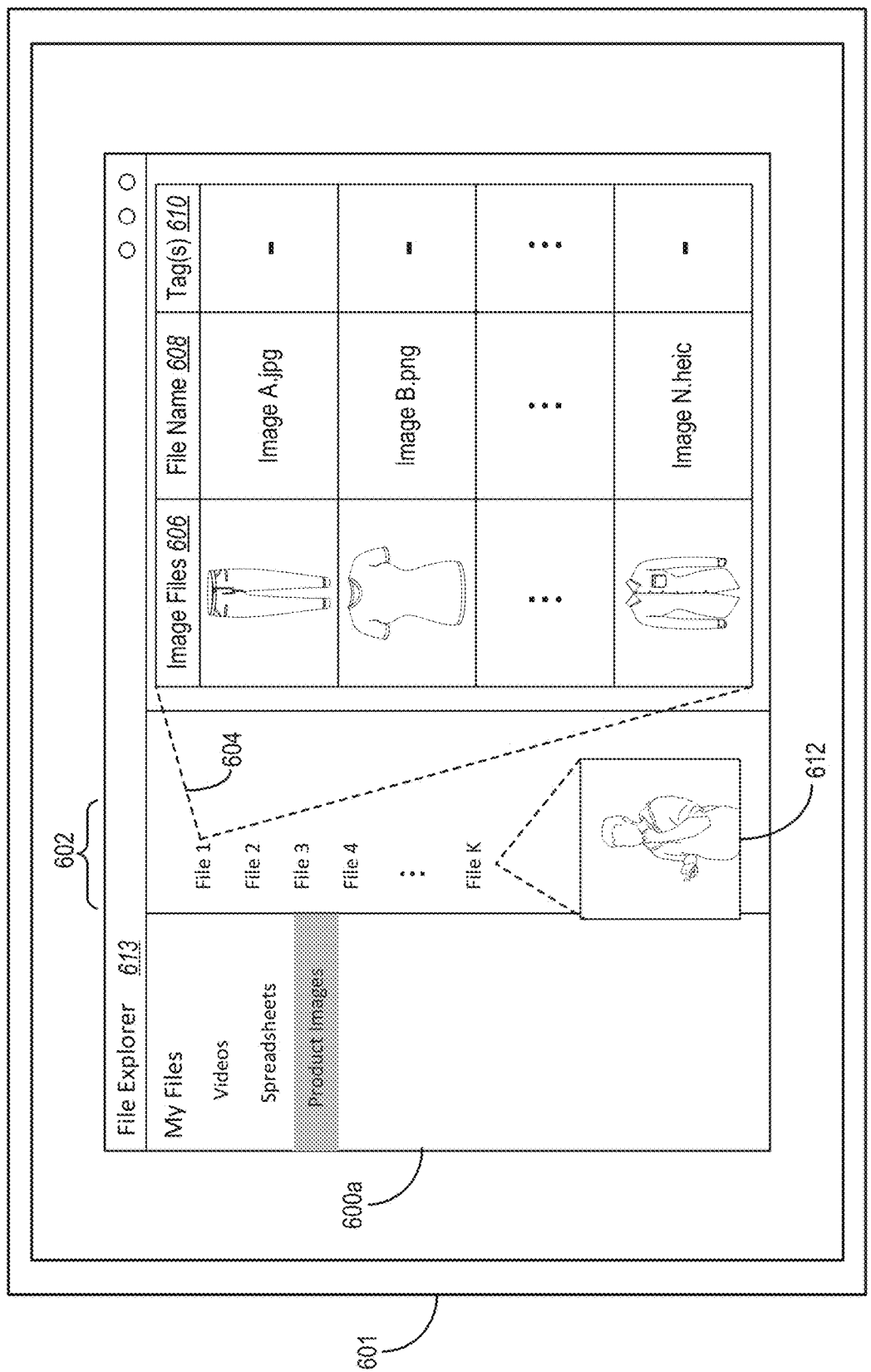
FIGS. 6A-6C illustrate example user interfaces on a computing device for interacting with the cognitive attribute classification system in accordance with one or more embodiments.
Figure 6B:
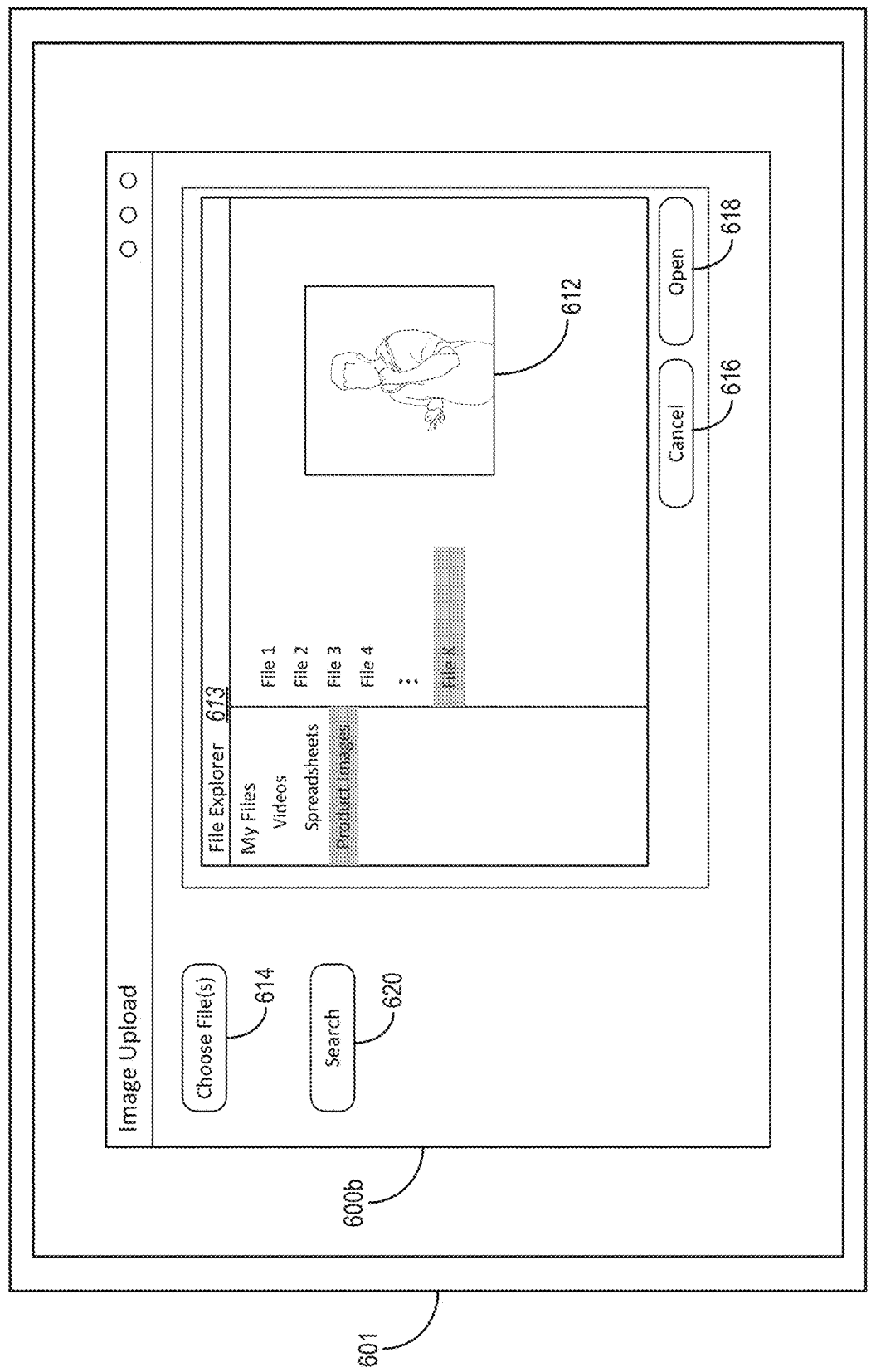
Figure 6C:
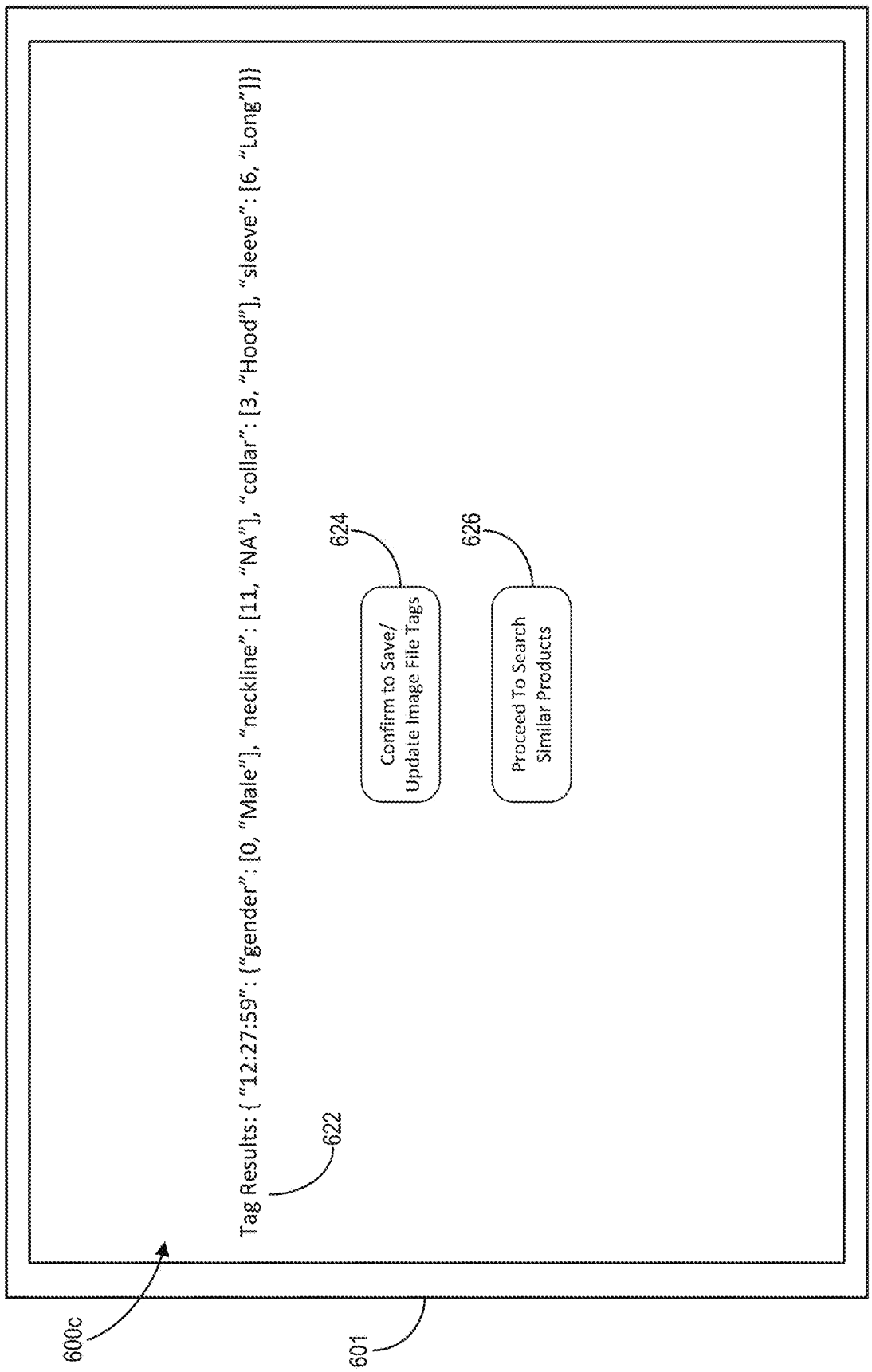

As mentioned above, the cognitive attribute classification system 106 can receive a database of images (e.g., a product catalog from a retailer) and/or an individual query image for generating one or more tags to be associated therewith, and/or for generating recommendations and search results similar to one or more query images (e.g., as a search query from a customer). FIGS. 6A-6C illustrate example user interfaces 600a-600c on a computing device 601 for selecting one or more image files to upload (e.g., as a tag/search query) and, in response, displaying one or more generated tags to be associated therewith and/or display generated recommendations and search results similar to the uploaded image file, in accordance with one or more embodiments of the present disclosure.

As shown in FIG. 6A, the user interface 600a includes a file explorer 613 indicating one or more files 602 that include images (e.g., product images). In an example file illustrated as "File 1," File 1 comprises an example product catalog in the form of a database 604 organized by image files 606, file name 608, and tag(s) 610. In another example file illustrated as "File K," File K comprises a single image file 612 (e.g., a downloaded picture from a client device or the Internet).

Further, the cognitive attribute classification system 106 can cause the computing device 601 to display the user interface 600b that includes a file explorer 613 for selectively uploading one or more files to the cognitive attribute classification system 106. In particular, the cognitive attribute classification system 106 can cause the computing device 601 to display the user interface 600b with the file explorer 613 in response to a user input at a "Choose File(s)" element 614 that can activate the file explorer 613.

Within the file explorer 613, the cognitive attribute classification system 106 enables, via the user interface 600b, the user to select which image file to upload to the cognitive attribute classification system 106. In this example scenario, the user interface 600b illustrates the File K selected in response to a user input (e.g., as denoted by the highlighting of the file name "File K" and display of the corresponding image file 612). To proceed with the upload, the cognitive attribute classification system 106 can receive a user input at the "Open" element 618, or else cancel the upload via a user input at the "Cancel" element 616. After receiving an input at the "Open" element 618, the cognitive attribute classification system 106 can receive another user input at a "Search" element 620 that executes computer instructions to perform one or more acts described in this disclosure (e.g., to tag the image file 612, search for similar items to the hoodie portrayed in the image file 612, and/or provide recommendations based on the hoodie in the image file 612).

After receiving a user input at the "Search" element 620, the cognitive attribute classification system 106 can, for instance as shown in FIG. 6C, cause the computing device 601 to display the user interface 600c with example tag results 622 and selectable options 624, 626. In some embodiments, the selectable option 624, when selected, can cause the cognitive attribute classification system 106 to save/update the image file 612 with the tags indicated in the tag results 622. In these or other embodiments, the selectable option 626, when selected, can cause the cognitive attribute classification system 106 to search similar products based on the selected image file 612 and/or the tag results 622.

Figure 7:
FIG. 7 illustrates a table reflecting experimental results regarding the effectiveness of the cognitive attribute classification system in accordance with one or more embodiments.

FIG. 7 illustrates a table 700 reflecting experimental results regarding the effectiveness of the cognitive attribute classification system 106 in accordance with one or more embodiments of the present disclosure. As shown in FIG. 7, the table 700 includes attribute classification accuracy scores categorized by attribute groups 702 for an example conventional system (i.e., the batch-norm inception-v1 model) and the cognitive attribute classification system 106 of the present disclosure. Thus, as indicated in FIG. 7, the cognitive attribute classification system 106 outperforms a conventional system. Moreover, the acts and algorithms described in the present disclosure as performed by the cognitive attribute classification system 106 provide improvements to the functioning of a computing device, which is evidenced in the example results depicted in FIG. 7. For example, by implementing interleaved neural network layers of dilated convolution layers and inception layers as described in the foregoing sections, the cognitive attribute classification system 106 can improve attribute classification accuracy scores and utilize a single network to localize multiple attributes of a query image compared to conventional models.

Figure 8:
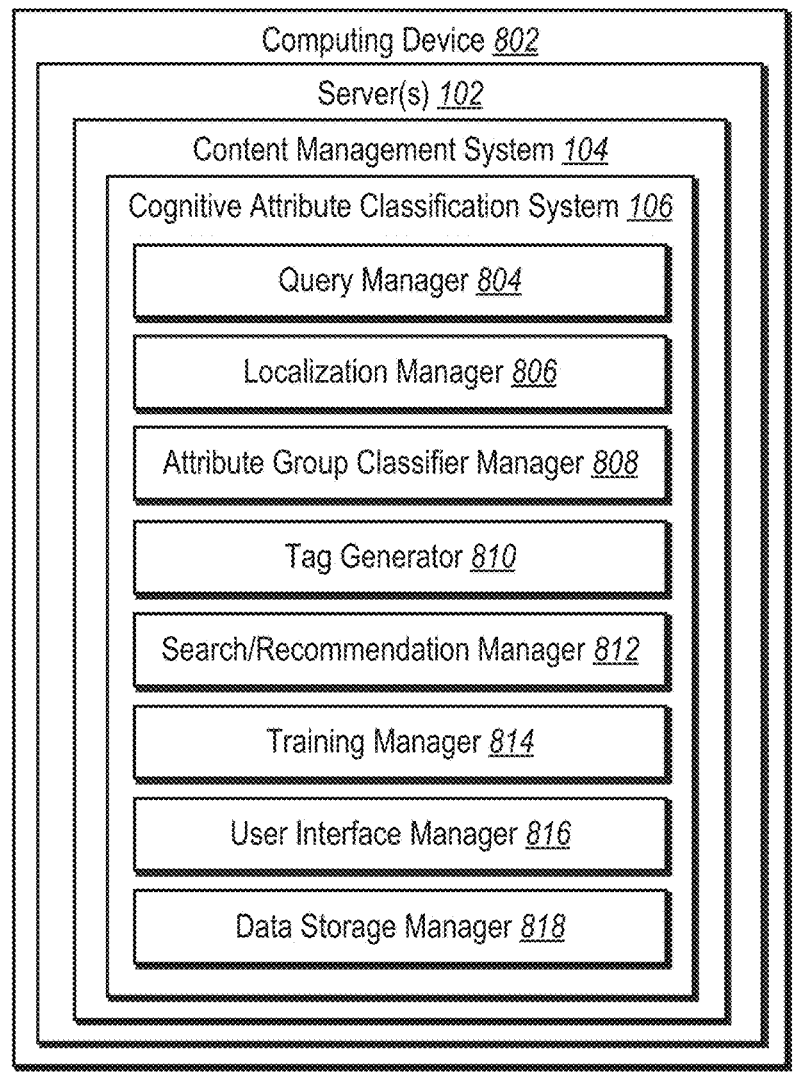
FIG. 8 illustrates an example schematic diagram of a cognitive attribute classification system in accordance with one or more embodiments.

Turning to FIG. 8, additional detail will now be provided regarding various components and capabilities of the cognitive attribute classification system 106. In particular, FIG. 8 illustrates an example schematic diagram of the cognitive attribute classification system 106 implemented by a computing device 802 of a computing system 800 in accordance with one or more embodiments of the present disclosure. As shown, the cognitive attribute classification system 106 is further implemented by the server(s) 102 and the content management system 104. Also illustrated, the cognitive attribute classification system 106 can include a query manager 804, a localization manager 806, an attribute group classifier manager 808, a tag generator 810, a search/recommendation manager 812, a training manager 814, a user interface manager 816, and a data storage manager 818.

The query manager 804 can obtain, send, receive, process, and/or analyze queries such as tag queries and search queries that include one or more image files for tagging and/or performing similarity searches and recommending products related thereto as described in relation to the foregoing figures. For example, the query manager 804 can receive from a retailer a tag query that includes a database of images (e.g., a product catalog) requested to be tagged by the cognitive attribute classification system 106. In particular, the query manager 804 can sort and/or perform pre-processing of portions of the tag query. Additionally or alternatively, the query manager 804 can relay data from the tag query to the localization manager 806.

The localization manager 806 can localize features/properties of objects portrayed in query images to determine attributes thereof. In particular, the localization manager 806 can apply the base localization neural network 204, which the localization manager 806 can instruct to analyze the one or more query images obtained from the query manager 804 as described in relation to the foregoing figures. For example, the localization manager 806 may apply the alternating inception layers and dilated convolution layers to one or more query images from the query manager 804 as also described above. In turn, the localization manager 806 may generate a localization feature vector for application to a global average pooling layer to create localization feature embeddings.

As also part of the cognitive attribute classification system 106, the attribute group classifier manager 808 can predict attributes of objects portrayed in query images, for example, based on localization feature embeddings. In particular, the attribute classifier manager 808 can apply the attribute group classifiers 206, which the attribute group classifier manager 808 can instruct to utilize localization feature embeddings to generate attribute scores and thereby predict which attributes correspond to the object in the query image as described in relation to the foregoing figures. For example, the attribute group classifiers 206 can, for each respective attribute group classifier, select at least one attribute with a highest attribute score among a set of attributes. Based on the predicted attributes selected as having the highest attribute scores, the tag generator 810 can generate one or more corresponding tags as described in relation to the foregoing figures. For example, the tag generator 810 may generate tags that are searchable/filterable and append the tags to the query images.

The search/recommendation manager 812 can conduct similarity analyses and determine relationships between a query image and candidate matches to the query image. For example, the search/recommendation manager 812 can utilize a grid search network and the tags generated by the tag generator 810 to determine what search results and product recommendations to surface to a user as described in relation to the foregoing figures. In particular, the search/recommendation manager 812 can compare grid-search feature vectors in similarity space and tags to filter out candidate matches to the query image.

As further part of the cognitive attribute classification system 106, the training manager 814 can train, teach, and/or learn machine learning models, such as the base localization neural network 204 and the attribute group classifiers 206 of the cognitive attribution neural network 208. For example, the training manager 814 can update parameters of the base localization neural network 204 and the attribute group classifiers 206 according to classification losses as described in relation to the foregoing figures. In particular, the training manager 814 can apply respective classification losses to corresponding attribute classifiers of the attribute group classifiers 206. Additionally or alternatively, the training manager 814 can apply all classification losses across all channels of the base localization neural network 204 or apply attribute group-specific losses to corresponding channels of the base localization neural network 204.

The user interface manager 816 can provide, manage, and/or control a graphical user interface (or simply "user interface"). In particular, the user interface manager 816 may generate and display a user interface by way of a display screen composed of a plurality of graphical components, objects, and/or elements that allow a user to perform a function. For example, the user interface manager 816 can receive user inputs from a user, such as a click/tap to provide a tag/search query. Additionally, the user interface manager 816 can present a variety of types of information, including text, digital media items, search results, product recommendations, or other information.

The data storage manager 818 maintains data for the cognitive attribute classification system 106. The data storage manager 818 (e.g., via one or more memory devices) can maintain data of any type, size, or kind, as necessary to perform the functions of the cognitive attribute classification system 106, including digital images; a cognitive attribution neural network comprising a base localization neural network and a plurality of attribute group classifiers, wherein the base localization neural network comprises a plurality of alternating dilated convolution layers and inception layers; parameters, ground truth data, a repository of candidate matches to query images, etc.

Each of the components of the computing device 802 can include software, hardware, or both. For example, the components of the computing device 802 can include one or more instructions stored on a computer-readable storage medium and executable by processors of one or more computing devices, such as a client device or server device. When executed by the one or more processors, the computer-executable instructions of the cognitive attribute classification system 106 can cause the computing device(s) (e.g., the computing device 802) to perform the methods described herein. Alternatively, the components of the computing device 802 can include hardware, such as a special-purpose processing device to perform a certain function or group of functions. Alternatively, the components of the computing device 802 can include a combination of computer-executable instructions and hardware.

Furthermore, the components of the computing device 802 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 802 may be implemented as a stand-alone application, such as a desktop or mobile application. Furthermore, the components of the computing device 802 may be implemented as one or more web-based applications hosted on a remote server.

The components of the computing device 802 may also be implemented in a suite of mobile device applications or "apps." To illustrate, the components of the computing device 802 may be implemented in an application, including but not limited to ADOBE® ANALYTICS, ADOBE® AUDIENCE MANAGER, ADOBE® EXPERIENCE MANAGER, ADOBE® CAMPAIGN, ADOBE® ADVERTISING, ADOBE® TARGET, or ADOBE® COMMERCE CLOUD. Product names, including "ADOBE" and any other portion of one or more of the foregoing product names, may include registered trademarks or trademarks of Adobe Systems Incorporated in the United States and/or other countries.

Figure 9:
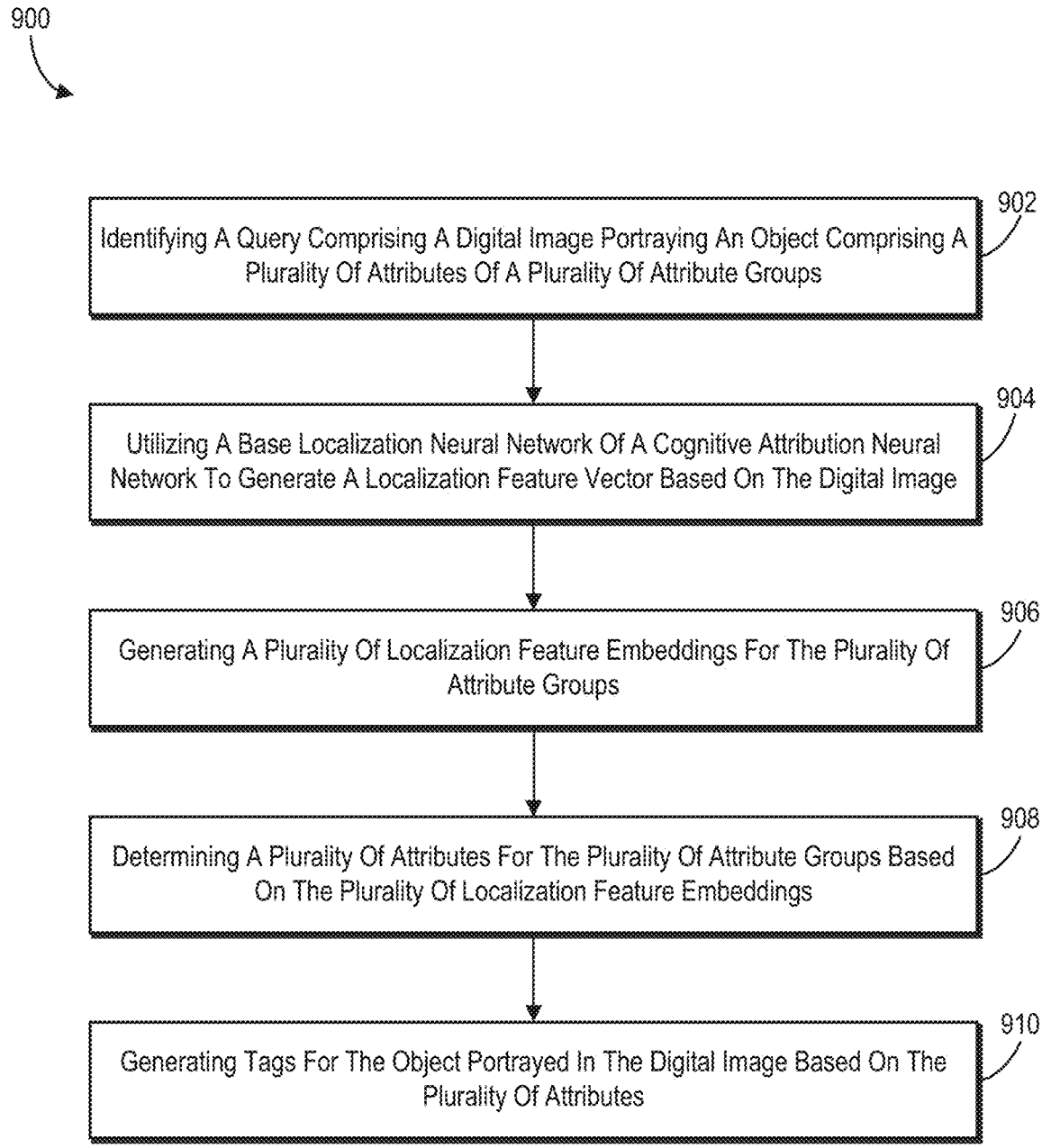
FIG. 9 illustrates a flowchart of a series of acts for generating tags for an object portrayed in a digital image in accordance with one or more embodiments.

FIGS. 1-8, the corresponding text, and the examples provide several different systems, methods, techniques, components, and/or devices of the cognitive attribute classification system 106 in accordance with one or more embodiments. In addition to the above description, one or more embodiments can also be described in terms of flowcharts including acts for accomplishing a particular result. For example, FIG. 9 illustrates a flowchart of a series of acts 900 for generating tags associated with an object portrayed in a digital image in accordance with one or more embodiments. The cognitive attribute classification system 106 may perform one or more acts of the series of acts 900 in addition to or alternatively to one or more acts described in conjunction with other figures. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown, the series of acts 900 includes an act 902 of identifying a query comprising a digital image portraying an object comprising a plurality of attributes of a plurality of attribute groups. In some embodiments, the query comprises a search query from a client device, and the series of acts 900 can further include generating, in response to the search query, recommendations of items similar to the object portrayed in the digital image based on the tags corresponding to the plurality of attributes from the plurality of attribute groups for the object portrayed in the digital image. Additionally or alternatively, in some embodiments the query comprises a tag query included in a batch of tag queries corresponding to a catalog of digital images.

The series of acts 900 further includes an act 904 of utilizing a base localization neural network of a cognitive attribution neural network to generate a localization feature vector based on the digital image. In some embodiments, the base localization neural network comprises a plurality of alternating dilated convolution layers and inception layers. Additionally or alternatively, in some embodiments the base localization neural network comprises a plurality of channels corresponding to the plurality of attribute groups. For example, a first channel of the plurality of channels can include a first set of alternating dilated convolution layers and inception layers. Similarly, for instance, a second channel of the plurality of channels can include a second set of alternating dilated convolution layers and inception layers.

The series of acts 900 further includes an act 906 of generating, based on the localization feature vector, a plurality of localization feature embeddings for the plurality of attribute groups. In some embodiments, generating the plurality of localization feature embeddings for the plurality of attribute groups comprises applying a global average pooling layer of the cognitive attribution network to the localization feature vector.

The series of acts 900 further includes an act 908 of determining, utilizing a plurality of attribute group classifiers of the cognitive attribution neural network, a plurality of attributes for the plurality of attribute groups based on the plurality of localization feature embeddings. In some embodiments, each attribute group classifier corresponds to an attribute group and is trained to generate a predicted attribute from a unique set of attributes corresponding to each attribute group. For example, the cognitive attribute classification system 106 can: determine a first attribute via a first attribute group classifier corresponding to a first attribute group, wherein the first attribute group comprises a first set of unique attributes; determine a second attribute via a second attribute group classifier corresponding to a second attribute group, wherein the second attribute group comprises a second set of unique attributes; and generate a first tag based on the first attribute and a second tag based on the second attribute. Thus, in some embodiments, the first attribute group classifier is trained to predicted attributes from a first set of attributes of the first attribute group and the second attribute group classifier is trained to predict attributes from a second set of attributes of the second attribute group.

The series of acts 900 further includes an act 910 of generating tags for the object portrayed in the digital image based on the plurality of attributes. In some embodiments, generating tags for the object portrayed in the digital image based on the plurality of attributes comprises: determining a first attribute score for the first attribute of the first attribute group; determining an additional attribute score for an additional attribute of the first attribute group; and selecting the first attribute score for the first attribute group classifier by comparing the first attribute score and the additional attribute score. Additionally or alternatively, the cognitive attribute classification system 106 can generate a first tag for the object in the digital image based on the first attribute of the first attribute group and a second tag for the object in the digital image based on the second attribute of the second attribute group. In these or other embodiments, the cognitive attribute classification system 106 can respond, based on the first tag and the second tag, to a query comprising the digital image portraying the object. Additionally or alternatively, responding to a query can include generating a database of tags for a catalog of digital images.

It is understood that the outlined acts in the series of acts 900 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 9, an act in the series of acts 900 may include an act to train the cognitive attribution neural network by: generating a set of predicted attributes based on attribute scores associated with each attribute of the plurality of attributes; determining a classification loss for each attribute group classifier by respectively comparing the set of predicted attributes with a set of ground truth attributes; and modifying learned parameters of the cognitive attribution neural network according to the classification losses. In some embodiments, modifying the learned parameters of the cognitive attribution neural network according to the classification losses comprises: updating, based on the classification losses, learned base-localization neural network parameters of the base localization neural network; and updating, based on classification losses specific to a corresponding attribute group classifier, learned attribute-group classifier parameters.

As another example act not shown in FIG. 9, an act in the series of acts 900 can include an act to generate, in similarity space of a grid search network, a grid-search feature vector representing the object portrayed in the digital image; and select the items similar to the object portrayed in the digital image based on: comparing the tags and additional tags corresponding to the items similar to the object portrayed in the digital image; and comparing distances between the grid-search feature vector representing the object portrayed in the digital image and a plurality of grid-search feature vectors corresponding to the items similar to the object portrayed in the digital image.

In addition (or in the alternative) to the acts described above, in some embodiments, the series of acts 900 can include performing a step for utilizing a base localization neural network of a cognitive attribution neural network to generate localization feature embeddings for the plurality of attribute groups. For instance, the acts and algorithms described above in relation to FIGS. 3A, 3B, 3C, and 3D can comprise the corresponding acts (or structure) for a step for utilizing a base localization neural network of a cognitive attribution neural network to generate localization feature embeddings for the plurality of attribute groups.

Similarly, in some embodiments, the series of acts 900 can include performing a step for utilizing a plurality of attribute group classifiers of the cognitive attribution neural network to generate tags corresponding to the plurality of attributes from the plurality of attribute groups for the object portrayed in the digital image. For instance, algorithms and acts described above in relation to FIGS. 2 and 3A can comprise the corresponding acts (or structure) for a step for utilizing a plurality of attribute group classifiers of the cognitive attribution neural network to generate tags corresponding to the plurality of attributes from the plurality of attribute groups for the object portrayed in the digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
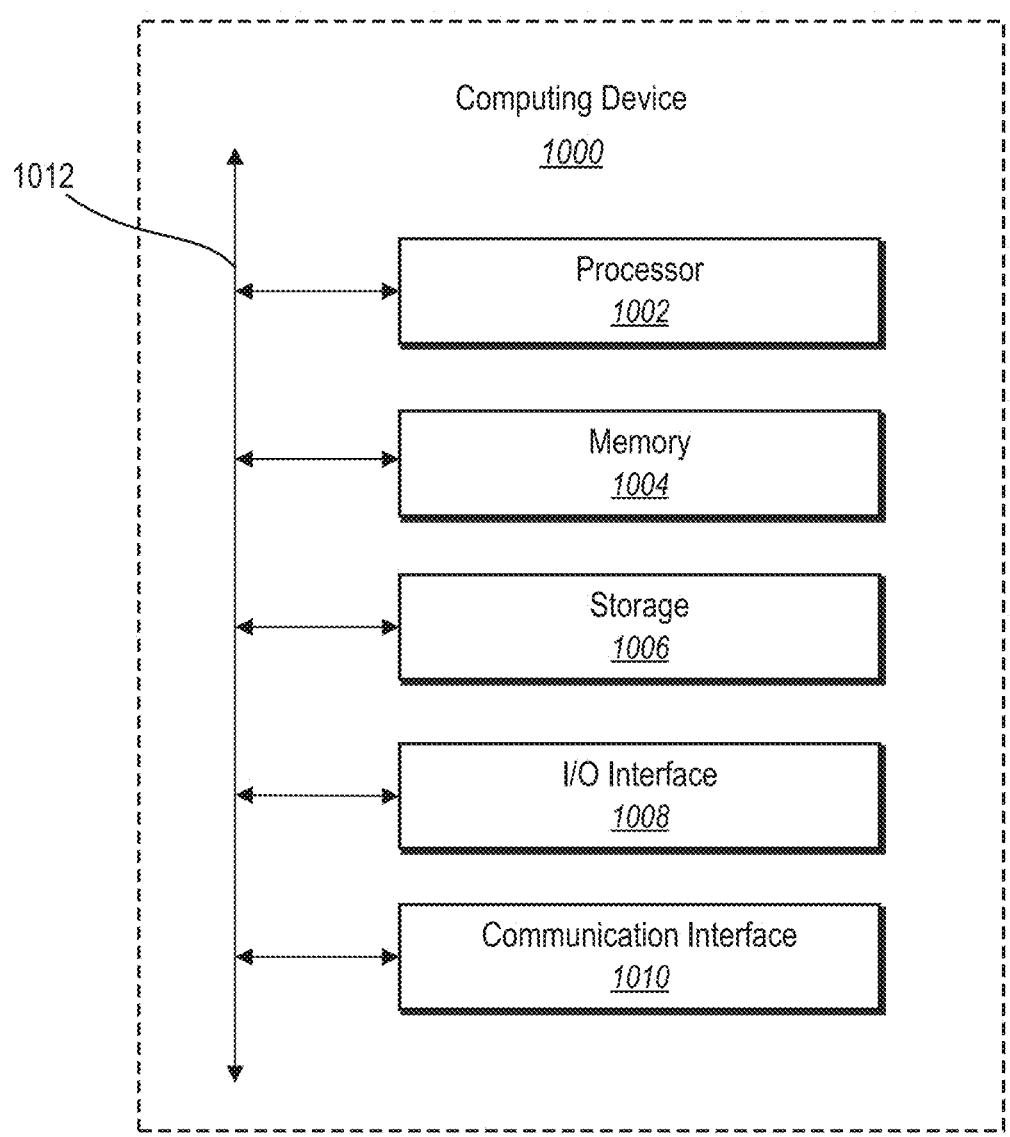
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., the computing device 802, the computing device 601, the server(s) 102, the administrator device 112, and/or the client device 108). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of the computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause the at least one processor perform operations comprising:
    identifying a search query comprising a digital image portraying an object comprising a plurality of attributes of a plurality of attribute groups;
    utilizing a cognitive attribution neural network to generate tags corresponding to the plurality of attributes from the plurality of attribute groups for the object portrayed in the digital image;
    identifying, in response to the search query, candidate matches tags corresponding to candidate image matches for the object portrayed in the digital image;
    comparing the candidate matches tags and the tags corresponding to the plurality of attributes from the plurality of attribute groups for the object portrayed in the digital image to identify items similar to the object portrayed in the digital image; and
    responding to the search query by generating recommendations of the items similar to the object portrayed in the digital image.

2. The non-transitory computer-readable medium of claim 1, wherein utilizing the cognitive attribution neural network to generate the tags corresponding to the plurality of attributes from the plurality of attribute groups for the object portrayed in the digital image comprises utilizing a base localization neural network of the cognitive attribution neural network to generate one or more localization feature vectors based on the digital image.

3. The non-transitory computer-readable medium of claim 2, wherein utilizing the cognitive attribution neural network to generate the tags corresponding to the plurality of attributes from the plurality of attribute groups for the object portrayed in the digital image comprises generating, based on the one or more localization feature vectors, a plurality of localization feature embeddings for the plurality of attribute groups.

4. The non-transitory computer-readable medium of claim 3, wherein utilizing the cognitive attribution neural network to generate the tags corresponding to the plurality of attributes from the plurality of attribute groups for the object portrayed in the digital image comprises determining, utilizing a plurality of attribute group classifiers of the cognitive attribution neural network, a set of attributes for the plurality of attribute groups based on the plurality of localization feature embeddings.

5. The non-transitory computer-readable medium of claim 4, wherein each attribute group classifier of the plurality of attribute group classifiers is configured to generate a subset of attributes corresponding to an attribute group of the plurality of attribute groups.

6. The non-transitory computer-readable medium of claim 5, wherein each attribute group classifier corresponds to an attribute group and is trained to generate a predicted attribute from a unique set of attributes corresponding to each attribute group.

7. The non-transitory computer-readable medium of claim 6, wherein the base localization neural network comprises a plurality of alternating dilated convolution layers and inception layers.

8. The non-transitory computer-readable medium of claim 4, wherein:
    the base localization neural network comprises a plurality of channels corresponding to the plurality of attribute groups;
    a first channel of the plurality of channels comprises a first set of alternating dilated convolution layers and inception layers; and
    a second channel of the plurality of channels comprises a second set of alternating dilated convolution layers and inception layers.

9. The non-transitory computer-readable medium of claim 4, wherein the operations further comprise generating the plurality of localization feature embeddings for the plurality of attribute groups by applying a global average pooling layer of the cognitive attribution neural network to the one or more localization feature vectors.

10. The non-transitory computer-readable medium of claim 4, wherein the operations further comprise:
    determining a first attribute via a first attribute group classifier corresponding to a first attribute group, wherein the first attribute group comprises a first set of unique attributes;
    determining a second attribute via a second attribute group classifier corresponding to a second attribute group, wherein the second attribute group comprises a second set of unique attributes; and
    generating a first tag based on the first attribute and a second tag based on the second attribute.

11. A computer-implemented method comprising:
    identifying a search query from a client device comprising a digital image portraying an object having a plurality of attributes corresponding to a plurality of attribute groups;
    utilizing a base localization neural network of a cognitive attribution neural network to generate localization feature embeddings for the plurality of attribute groups;
    utilizing a plurality of attribute group classifiers of the cognitive attribution neural network to generate tags corresponding to the plurality of attributes from the plurality of attribute groups for the object portrayed in the digital image;
    identifying, in response to the search query, candidate matches tags corresponding to candidate image matches for the object portrayed in the digital image;
    comparing the candidate matches tags and the tags corresponding to the plurality of attributes from the plurality of attribute groups for the object portrayed in the digital image to identify items similar to the object portrayed in the digital image; and
    responding to the search query by generating recommendations of the items similar to the object portrayed in the digital image.

12. The computer-implemented method of claim 11, wherein the base localization neural network comprises a plurality of alternating dilated convolution layers and inception layers.

13. The computer-implemented method of claim 11, further comprising:
    generating, in similarity space of a grid search network, a grid-search feature vector representing the object portrayed in the digital image; and
    selecting items similar to the object portrayed in the digital image based on:
        comparing the tags and additional tags corresponding to the items similar to the object portrayed in the digital image, wherein the object comprises an item of clothing; and
        comparing distances between the grid-search feature vector representing the object portrayed in the digital image and a plurality of grid-search feature vectors corresponding to the items similar to the object portrayed in the digital image.

14. The computer-implemented method of claim 11, wherein the search query comprises a tag query included in a batch of tag queries corresponding to a catalog of digital images, and further comprising:

adding the tags to a database of tags for the catalog of digital images comprises saving the tags in association with the digital image and updating one or more files comprising the digital image to include the saved tags.

15. A system comprising:

one or more memory devices comprising:
 a digital image portraying an object; and
 a cognitive attribution neural network; and one or more processor devices configured to cause the system to:
 identify a query comprising a digital image portraying an object comprising a plurality of attributes of a plurality of attribute groups;
 utilize the cognitive attribution neural network to generate tags corresponding to the plurality of attributes from the plurality of attribute groups for the object portrayed in the digital image;
 generate, in similarity space of a grid search network, a grid-search feature vector representing the object portrayed in the digital image; and
 select items similar to the object portrayed in the digital image based on:
  comparing the tags and additional tags corresponding to the items similar to the object portrayed in the digital image; and
  comparing distances between the grid-search feature vector representing the object portrayed in the digital image and a plurality of grid-search feature vectors corresponding to the items similar to the object portrayed in the digital image.

16. The system of claim 15, wherein the cognitive attribution neural network comprises a base localization neural network and a plurality of attribute group classifiers, wherein the base localization neural network comprises a plurality of alternating dilated convolution layers and inception layers.

17. The system of claim 16, wherein the one or more processor devices are further configured to cause the system to generate one or more localization feature vectors by analyzing the digital image via the plurality of alternating dilated convolution layers and inception layers of the base localization neural network of the cognitive attribution neural network.

18. The system of claim 17, wherein the one or more processor devices are further configured to cause the system to generate a plurality of attribute localization feature embeddings for a plurality of attribute groups based on the one or more localization feature vectors.

19. The system of claim 18, wherein the one or more processor devices are further configured to cause the system to:

determine, utilizing each attribute group classifier of the plurality of attribute group classifiers, a subset of attributes corresponding to an attribute group of the plurality of attribute groups; and generate the tags corresponding to the plurality of attributes from the plurality of attribute groups for the object portrayed in the digital image based on the subset of attributes.

20. The system of claim 16, wherein the base localization neural network comprises a plurality of channels corresponding to a plurality of attributes for the object of the digital image and each channel of the plurality of channels comprises a plurality of alternating dilated convolution layers and inception layers.

* * * * *